United States Patent
Suzuki et al.

(10) Patent No.: US 11,077,692 B2
(45) Date of Patent: Aug. 3, 2021

(54) AQUEOUS PIGMENT DISPERSION

(71) Applicant: KAO CORPORATION, Tokyo (JP)

(72) Inventors: Takayuki Suzuki, Barcelona (ES);
Takako Yamamoto, Utsunomiya (JP);
Erika Maekawa, Odawara (JP);
Yasufumi Ueda, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 16/635,098

(22) PCT Filed: Jul. 27, 2018

(86) PCT No.: PCT/JP2018/028309
§ 371 (c)(1),
(2) Date: Jan. 29, 2020

(87) PCT Pub. No.: WO2019/026804
PCT Pub. Date: Feb. 7, 2019

(65) Prior Publication Data
US 2020/0156396 A1 May 21, 2020

(30) Foreign Application Priority Data
Aug. 2, 2017 (JP) .............................. JP2017-150145

(51) Int. Cl.
*B41M 5/00* (2006.01)
*C08F 220/18* (2006.01)
*C08F 212/08* (2006.01)
*C08F 220/06* (2006.01)
*C08J 3/07* (2006.01)
*C09C 1/56* (2006.01)
*C09C 3/10* (2006.01)
(Continued)

(52) U.S. Cl.
CPC .............. *B41M 5/0023* (2013.01); *B41J 2/01* (2013.01); *B41J 2/2107* (2013.01); *C08F 212/08* (2013.01); *C08F 220/06* (2013.01); *C08F 220/1807* (2020.02); *C08J 3/07* (2013.01); *C09C 1/56* (2013.01); *C09C 3/10* (2013.01); *C09D 11/107* (2013.01); *C09D 11/322* (2013.01); *C09D 11/326* (2013.01); *C09D 11/38* (2013.01); *C08F 2810/20* (2013.01); *C08J 2325/14* (2013.01); *C08J 2333/02* (2013.01); *C08J 2333/10* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 290/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41J 2/04588; B41J 2/04595; B41J 2/04586; B41J 2/14274; B41J 5/5227; B41M 5/0011; B41M 5/0017; B41M 5/0023; B41M 5/0047; B41M 7/00; B41M 7/0072; B41M 5/52; B41M 5/5218; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
See application file for complete search history.

(56) References Cited

U.S. PATENT DOCUMENTS 5,925,177 A   7/1999 Carreira et al.
6,114,366 A   9/2000 Lutz et al.
(Continued)

FOREIGN PATENT DOCUMENTS

JP    55-16037 A    2/1980
JP    60-221466 A   11/1985
(Continued)

OTHER PUBLICATIONS

International Search Report for PCT/JP2018/028309 dated Sep. 4, 2018.
(Continued)

*Primary Examiner* — Manish S Shah
(74) *Attorney, Agent, or Firm* — Birch, Stewart, Kolasch & Birch, LLP

(57) ABSTRACT

The present invention relates to a pigment water dispersion containing a pigment, a crosslinked polymer and water, in which the crosslinked polymer is prepared by crosslinking a carboxy group-containing polymer with a crosslinking agent, and has an acid value of not less than 70 mgKOH/g and not more than 300 mgKOH/g; and the pigment water dispersion further contains a formaldehyde-releasing compound. The pigment water dispersion of the present invention is excellent in storage stability even when being stored under high-temperature conditions for a long period of time.

17 Claims, No Drawings

(51) Int. Cl.
  *C09D 11/107* (2014.01)
  *C09D 11/322* (2014.01)
  *C09D 11/326* (2014.01)
  *C09D 11/38* (2014.01)
  *B41J 2/01* (2006.01)
  *B41J 2/21* (2006.01)

(56) References Cited

U.S. PATENT DOCUMENTS

| | | | |
|---|---|---|---|
| 6,433,039 | B1 | 8/2002 | Schwarz |
| 2007/0259989 | A1 | 11/2007 | Berge et al. |
| 2009/0087788 | A1* | 4/2009 | Kanchiku ............ B41C 1/1008 430/286.1 |
| 2012/0125672 | A1* | 5/2012 | Minegishi ................ C09D 4/06 174/258 |
| 2015/0126479 | A1* | 5/2015 | Premachandran ..... A01N 25/02 514/161 |
| 2016/0062235 | A1* | 3/2016 | Itou ......................... G02B 5/20 252/586 |
| 2019/0284410 | A1 | 9/2019 | Azuma et al. |

FOREIGN PATENT DOCUMENTS

| | | |
|---|---|---|
| JP | 11-335610 A | 12/1999 |
| JP | 2004-231896 A | 8/2004 |
| JP | 2004-231897 A | 8/2004 |
| JP | 2009-108115 A | 5/2009 |
| JP | 2009-535486 A | 10/2009 |
| JP | 2011-137102 A | 7/2011 |
| JP | 2015-196745 A | 11/2015 |
| JP | 2017-119845 A | 7/2017 |
| WO | WO 00/24679 A1 | 5/2000 |

OTHER PUBLICATIONS

Extended European Search Report for European Application No. 18540386.9, dated Apr. 7, 2021.

* cited by examiner

AQUEOUS PIGMENT DISPERSION

FIELD OF THE INVENTION

The present invention relates to a pigment water dispersion.

BACKGROUND OF THE INVENTION

In general, a pigment water dispersion tends to suffer from defects such as mold growth or propagation of putrefying bacteria over time, and therefore a mildew-proof agent or an antiseptic agent has been used in the pigment water dispersion.

For example, as an aqueous ink composition for writing utensils such as sign pens and ballpoint pens which is free of putrefaction owing to mold growth or propagation of putrefying bacteria without any adverse influence on the composition even after being stored for a long period of time, JP 2004-231896A (Patent Literature 1) discloses an aqueous ink composition containing a colorant, water, 1-(3-chloroallyl)-3,5,7-triaza-1-azonia adamantene chloride as an antiseptic agent, etc., and JP 2004-231897A (Patent Literature 2) discloses an aqueous ink composition containing a colorant, water, 1,3-dimethylol-5,5-dimethyl hydantoin as an antiseptic agent, etc.

On the other hand, in ink-jet printing methods, droplets of ink are directly ejected from very fine nozzles to a printing medium and allowed to adhere onto the printing medium to obtain characters or images printed thereon. The ink-jet printing methods have become rapidly spread because of various advantages such as easiness of full coloration, low cost, capability of using a plain paper as the printing medium, non-contact with the printed characters or images, etc.

In recent years, in order to impart good weathering resistance and water resistance to printed materials, water-based inks containing a pigment as a colorant have been widely used. From the viewpoint of improving ejection stability and storage stability of the water-based inks, there have been developed technologies using a polymer dispersant, etc., in order to stably compound the pigment in the water-based inks.

JP 2009-535486A (Patent Literature 3) discloses an ink-jet ink that can be used to produce printed products having higher durability. In Examples of the Patent Literature 3, there is described the ink containing a dispersion liquid prepared by dispersing a black pigment with a non-crosslinked anionic polymer dispersant, 1,3-dihydrosylmethyl-5,5-dimethyl hydantoin (corresponding to an antiseptic agent), etc.

JP 2009-108115A (Patent Literature 4) discloses a water-based ink for ink-jet printing which is excellent in storage stability and anti-curling properties, and contains colorant-containing crosslinked polymer particles. In Examples of the Patent Literature 4, there is described the water-based ink containing a water dispersion of pigment-containing crosslinked polymer particles obtained by crosslinking an uncrosslinked polymer having an acid value of 72 mgKOH/g or 111 mgKOH/g (an acid value of the crosslinked polymer corresponds to 58 to 66 mgKOH/g) and "Ploxel XL2" (corresponding to an antiseptic agent).

SUMMARY OF THE INVENTION

The present invention relates to a pigment water dispersion containing a pigment, a crosslinked polymer and water, in which the crosslinked polymer is prepared by crosslinking a carboxy group-containing polymer with a crosslinking agent, and has an acid value of not less than 70 mgKOH/g and not more than 300 mgKOH/g; and the pigment water dispersion further contains a formaldehyde-releasing compound.

DETAILED DESCRIPTION OF THE INVENTION

It is considered that in order to improve storage stability of a pigment dispersion prepared by dispersing a pigment with a polymer, it is effective 1) to subject the polymer to crosslinking reaction for the purpose of improving adsorption of the polymer onto a surface of the pigment, 2) to enhance an acid value of the polymer and increase charge repulsion between the polymer particles owing to acid groups therein for the purpose of suppressing unification or aggregation between the polymer particles used for dispersing the pigment, in an aqueous system, etc.

However, in the pigment water dispersion prepared by dispersing the pigment with the crosslinked polymer, even when using, for example, the crosslinked polymer having an acid value of not less than 70 mgKOH/g, and more particularly the crosslinked polymer having a higher acid value of not less than 150 mgKOH/g, the resulting pigment water dispersion tends to sometimes still fail to exhibit improved storage stability to such an extent as expected.

The present invention relates to a pigment water dispersion prepared by dispersing a pigment with a crosslinked polymer having an acid value of not less than 70 mgKOH/g, and more particularly a pigment water dispersion prepared by dispersing a pigment with a crosslinked polymer having a higher acid value of not less than 150 mgKOH/g. The pigment water dispersion of the present invention is excellent in storage stability even when stored under high-temperature conditions for a long period of time.

That is, the present invention relates to a pigment water dispersion containing a pigment, a crosslinked polymer and water, in which the crosslinked polymer is prepared by crosslinking a carboxy group-containing polymer with a crosslinking agent, and has an acid value of not less than 70 mgKOH/g and not more than 300 mgKOH/g; and the pigment water dispersion further contains a formaldehyde-releasing compound.

In accordance with the present invention, it is possible to provide a pigment water dispersion prepared by dispersing a pigment with a crosslinked polymer having an acid value of not less than 70 mgKOH/g, and more particularly a pigment water dispersion prepared by dispersing a pigment with a crosslinked polymer having a higher acid value of not less than 150 mgKOH/g, which is excellent in storage stability even when stored under high-temperature conditions for a long period of time.

[Pigment Water Dispersion]

The pigment water dispersion of the present invention is characterized by containing a pigment, a crosslinked polymer and water, in which the crosslinked polymer is prepared by crosslinking a carboxy group-containing polymer with a crosslinking agent, and has an acid value of not less than 70 mgKOH/g and not more than 300 mgKOH/g; and the pigment water dispersion further contains a formaldehyde-releasing compound.

The pigment water dispersion of the present invention is excellent in storage stability even when stored under high-temperature conditions for a long period of time. The reason why the aforementioned advantageous effect can be attained by the present invention is considered as follows though it is not clearly determined yet.

That is, it is considered that in order to improve storage stability of the pigment water dispersion, from the viewpoint of suppressing unification or aggregation between the crosslinked polymer particles used for dispersing the pigment in an aqueous system, it is effective to increase charge repulsion between the crosslinked polymer particles owing to acid groups of the crosslinked polymer, such as carboxy groups. However, even though the number of the acid groups of the crosslinked polymer is increased to enhance an acid value of the polymer, the resulting pigment water dispersion tends to sometimes still fail to exhibit improved storage stability to such an extent as expected. The reason therefor is considered to be that the polymer becomes rigid when crosslinked, and disposition of the acid groups in the polymer is restricted, so that the acid groups tend to have poor contribution to charge repulsion between the crosslinked polymer particles. In this case, when using a formaldehyde-releasing compound in the pigment water dispersion, the formaldehyde released from the compound accelerates plasticization of the crosslinked polymer to relax restriction of the disposition of the acid groups in the polymer, so that the acid groups can suitably contribute to charge repulsion between the crosslinked polymer particles. As a result, it is considered that the acid groups can efficiently retain charge repulsion between the crosslinked polymer particles, so that the resulting pigment water dispersion is free of unification or aggregation between the crosslinked polymer particles even when stored under high-temperature conditions for a long period of time, and therefore can maintain good storage stability.

<Pigment>

The pigment used in the present invention is not particularly limited, and may be either an organic pigment or an inorganic pigment and may also be used in the form of a mixture of these pigments.

Examples of the organic pigment include at least one pigment selected from the group consisting of condensed polycyclic pigments such as anthraquinone-based pigments, quinacridone-based pigments, indigo-based pigments, dioxazine-based pigments, perylene-based pigments, perinone-based pigments, isoindolinone-based pigments, isoindoline-based pigments, phthalocyanine-based pigments, quinophthalone-based pigments and diketopyrrolopyrrole-based pigments, and azo-based pigments such as disazo-based pigments and condensed azo-based pigments. Of these organic pigments, from the viewpoint of improving color reproducibility thereof, preferred is at least one pigment selected from the group consisting of quinacridone-based pigments, azo-based pigments and phthalocyanine-based pigments.

Specific examples of the quinacridone-based pigments that are capable of exhibiting a magenta color include C.I. PR (Pigment Red) 122, PR 192, PR 202, PR 207 and PR 209; and C.I. PV (Pigment Violet) 19, etc. Of these quinacridone-based pigments, preferred is at least one pigment selected from the group consisting of C.I. PR 122 and C.I. PV 19. Specific examples of the azo-based pigments that are capable of exhibiting a yellow color include C.I. PY (Pigment Yellow) 74, PY 151, PY 154, PY 155, PY 180 and PY 213. Of these azo-based pigments, preferred is at least one pigment selected from the group consisting of C.I. PY 74 and C.I. PY 154. Specific examples of the phthalocyanine-based pigments that are capable of exhibiting a cyan color or a green color include C.I. PB (Pigment Blue) 15:1, PB 15:2, PB 15:3, PB 15:4, PB 15:5, PB 15:6 and PB 16; and C.I. PG (Pigment Green) 7 and PG 36. Of these phthalocyanine pigments, from the viewpoint of well exhibiting a cyan color, preferred is at least one pigment selected from the group consisting of C.I. PB 15:3 and C.I. PB 15:4.

The organic pigment may also include a derivative of the organic pigment as a raw material thereof. The organic pigment derivative may be produced by conducting such a treatment in which a functional group such as a hydroxy group, a carboxy group, a carbamoyl group, a sulfo group, a sulfonamide group and a phthalimidomethyl group is bonded to the surface of the organic pigment.

Examples of the inorganic pigment include carbon blacks and metal oxides such as alumina and titanium dioxide. These inorganic pigments may be treated with a conventionally known hydrophobization agent such as a titanium coupling agent, a silane coupling agent and a higher fatty acid metal salt, etc.

The carbon blacks are preferably used for black inks. Examples of the carbon blacks include furnace blacks, thermal lamp blacks, acetylene blacks and channel blacks, and the carbon blacks may also be surface-treated carbon blacks.

The aforementioned pigments may be used alone or in the form of a mixture of any two or more thereof.

In the present invention, the pigment is preferably present in the pigment water dispersion in the form of pigment-containing crosslinked polymer particles (hereinafter also referred to merely as "pigment-containing polymer particles"). The "pigment-containing" as used herein means the configuration in which the pigment is enclosed or encapsulated in the crosslinked polymer, the configuration in which the pigment is partially enclosed or encapsulated in the crosslinked polymer and partially exposed outside from the crosslinked polymer, or the configuration in which the crosslinked polymer is adhered onto a surface of the pigment, as well as a mixture of these configuration. Among these configurations of the pigment-containing polymer particles, preferred is the configuration in which the pigment is enclosed or encapsulated in the crosslinked polymer.

<Crosslinked Polymer>

The crosslinked polymer used in the present invention has not only a function as a pigment dispersant that is capable of exhibiting the effect of dispersing the pigment, but also a function as a fixing agent for fixing the pigment onto a medium such as a printing medium, and also has an acid value of not less than 70 mgKOH/g and not more than 300 mgKOH/g. The crosslinked polymer may be prepared by crosslinking either a water-soluble polymer or a water-insoluble polymer (the water-soluble polymer or water-insoluble polymer before being crosslinked is hereinafter also referred to merely as a "polymer before being crosslinked") as long as the acid value of the resulting crosslinked polymer lies within the aforementioned range. However, the crosslinked polymer is usually prepared by crosslinking a carboxy group-containing polymer, preferably prepared by crosslinking a carboxy group-containing water-insoluble polymer, and more preferably prepared by crosslinking a carboxy group-containing acrylic polymer. From the viewpoint of improving dispersibility of the pigment and storage stability of the pigment water dispersion, the crosslinked polymer is preferably in the form of a water-insoluble polymer.

The "water-insoluble polymer" as used herein means that the polymer is still kept water-insoluble either in an unneutralized state or even after partially neutralizing carboxy groups of the polymer. The term "water-insoluble" as used herein means that when the polymer is dispersed in water, the resulting solution does not become transparent. More specifically, the "water-insoluble" means that when the polymer is dried at 105° C. for 2 hours and then dissolved in 100 g of water at 25° C., the solubility in water of the polymer is not more than 10 g, preferably not more than 5 g and more preferably not more than 1 g. In the case where the polymer contains a salt-forming group, the aforementioned solubility means a solubility in water of the polymer whose salt-forming groups are neutralized completely (i.e., 100%) with acetic acid, sodium hydroxide, etc., according to the kinds of salt-forming groups contained.

The acid value of the crosslinked polymer is not less than 70 mgKOH/g, and preferably not less than 85 mgKOH/g from the viewpoint of improving storage stability of the pigment water dispersion. From the viewpoint of improving storage stability of the pigment water dispersion for a longer period of time, the acid value of the crosslinked polymer is more preferably not less than 150 mgKOH/g and even more preferably not less than 155 mgKOH/g, and is also not more than 300 mgKOH/g, preferably not more than 280 mgKOH/g, more preferably not more than 270 mgKOH/g and even more preferably not more than 260 mgKOH/g. When the acid value of the crosslinked polymer lies within the aforementioned range, the amount of the carboxy groups and the neutralized carboxy groups in the crosslinked polymer is sufficient, and it is therefore possible to ensure good dispersion stability of the pigment and storage stability of the resulting pigment water dispersion. In addition, the acid value of the crosslinked polymer which lies within the aforementioned range is also preferred from the viewpoint of attaining good balance between affinity of the polymer dispersant to an aqueous medium, and interaction of the polymer dispersant with the pigment.

The acid values of the polymer before being crosslinked and the crosslinked polymer may also be determined by a potentiometric titration method.

(Water-Soluble Polymer)

The acid value of the water-soluble polymer used for preparing the crosslinked polymer is preferably not less than 170 mgKOH/g and more preferably not less than 200 mgKOH/g, and is also preferably not more than 380 mgKOH/g, more preferably not more than 350 mgKOH/g and even more preferably not more than 300 mgKOH/g, from the viewpoint of improving storage stability of the pigment water dispersion.

Examples of the water-soluble polymer include water-soluble vinyl polymers, water-soluble ester polymers, water-soluble urethane polymers, etc. Among these water-soluble polymers, preferred are carboxy group-containing water-soluble polymers, and furthermore from the viewpoint of efficiently dispersing the pigment, preferred are water-soluble vinyl polymers obtained by addition-polymerization of a vinyl monomer, and more preferred are vinyl polymers obtained by copolymerizing the below-mentioned monomer mixture containing the below-mentioned carboxy group-containing vinyl monomer (a) and the below-mentioned hydrophobic vinyl monomer (b).

Among these monomers, as the component (a), preferred are acrylic acid and methacrylic acid, and as the component (b), preferred are styrene and benzyl (meth)acrylate, and more preferred is styrene.

The weight-average molecular weight of the water-soluble polymer is preferably not less than 1,000, more preferably not less than 2,000, even more preferably not less than 4,000 and further even more preferably not less than 6,000, and is also preferably not more than 100,000, more preferably not more than 50,000, even more preferably not more than 30,000 and further even more preferably not more than 20,000, from the viewpoint of improving dispersibility of the pigment and storage stability of the pigment water dispersion.

Examples of commercially available products of the water-soluble polymer include "JONCRYL (registered trademark) 52J", "JONCRYL 57J", "JONCRYL 60J", "JONCRYL 61J", "JONCRYL 63J", "JONCRYL 70J", "JONCRYL 501J", "JONCRYL 683", "JONCRYL JDX-6180", "JONCRYL HPD-96J", "JONCRYL HPD-196", "JONCRYL PDX6102", "JONCRYL PDX6124", "JONCRYL PDX6137A", "JONCRYL 6610" and "JONCRYL 6500" all available from BASF Japan, Ltd., etc.

(Water-Insoluble Polymer)

The acid value of the water-insoluble polymer used for preparing the crosslinked polymer is preferably not less than 90 mgKOH/g, more preferably not less than 160 mgKOH/g and even more preferably not less than 170 mgKOH/g, and is also preferably not more than 350 mgKOH/g, more preferably not more than 290 mgKOH/g, even more preferably not more than 280 mgKOH/g and further even more preferably not more than 270 mgKOH/g, from the viewpoint of improving storage stability of the pigment water dispersion.

Examples of the water-insoluble polymer include at least one polymer selected from the group consisting of polyesters, polyurethanes and vinyl-based polymers such as acrylic polymers. Among these water-insoluble polymers, from the viewpoint of improving storage stability of the pigment water dispersion, preferred are vinyl-based polymers obtained by addition-polymerizing at least one vinyl monomer selected from the group consisting of a vinyl compound, a vinylidene compound and a vinylene compound. In addition, the water-insoluble polymer is preferably in the form of a carboxy group-containing polymer.

The water-insoluble polymer is preferably a vinyl-based polymer that is produced by copolymerizing a vinyl monomer mixture containing (a) a carboxy group-containing vinyl monomer (hereinafter also referred to merely as a "component (a)") and (b) a hydrophobic vinyl monomer (hereinafter also referred to merely as a "component (b)") (such a mixture is hereinafter also referred to merely as a "monomer mixture"). The vinyl-based polymer contains a constitutional unit derived from the component (a) and a constitutional unit derived from the component (b). The vinyl-based polymer may further contain at least one constitutional unit selected from the group consisting of a constitutional unit derived from (c) a macromonomer (hereinafter also referred to merely as a "component (c)") and a constitutional unit derived from (d) a nonionic monomer (hereinafter also referred to merely as a "component (d)").

[(a) Carboxy Group-Containing Vinyl Monomer]

The carboxy group-containing vinyl monomer (a) is used as a monomer component of the water-insoluble polymer from the viewpoint of improving storage stability of the pigment-containing polymer particles in the pigment water dispersion. As the carboxy group-containing vinyl monomer, there may be used carboxylic acid monomers.

Examples of the carboxylic acid monomers include acrylic acid, methacrylic acid, crotonic acid, itaconic acid, maleic acid, fumaric acid, citraconic acid, 2-methacryloyloxymethylsuccinic acid and the like. Among these carboxylic acid monomers, preferred is at least one monomer selected from the group consisting of acrylic acid and methacrylic acid.

[(b) Hydrophobic Vinyl Monomer]

The hydrophobic vinyl monomer (b) is used as a monomer component of the water-insoluble polymer from the viewpoint of improving storage stability of the pigment-containing polymer particles in the pigment water dispersion. Examples of the hydrophobic vinyl monomer include an alkyl (meth)acrylate, an aromatic group-containing monomer and the like which contain an alkyl group having not less than 1 and not more than 22 carbon atoms or an aryl group having not less than 6 and not more than 22 carbon atoms.

As the alkyl (meth)acrylic acid ester, preferred are those alkyl (meth)acrylic acid esters containing an alkyl group having 1 to 22 carbon atoms and preferably 6 to 18 carbon atoms. Examples of the alkyl (meth)acrylic acid esters include methyl (meth)acrylate, ethyl (meth)acrylate, propyl (meth)acrylate, butyl (meth)acrylate, amyl (meth)acrylate, cyclohexyl (meth)acrylate, 2-ethylhexyl (meth)acrylate, octyl (meth)acrylate, decyl (meth)acrylate, dodecyl (meth) acrylate, stearyl (meth)acrylate, isopropyl (meth)acrylate, isobutyl (meth)acrylate, tert-butyl (meth)acrylate, isoamyl (meth)acrylate, isooctyl (meth)acrylate, isodecyl (meth) acrylate, isododecyl (meth)acrylate and isostearyl (meth) acrylate, etc.

Meanwhile, the term "(meth)acrylate" as used herein means at least one compound selected from the group consisting of an acrylate and a methacrylate, and the term "(meth)" is hereinafter also defined in the same way.

The aromatic group-containing monomer is preferably a vinyl monomer containing an aromatic group having 6 to 22 carbon atoms which may contain a substituent group containing a hetero atom, and more preferably a styrene-based monomer or an aromatic group-containing (meth)acrylate.

Specific examples of the preferred styrene-based monomer include styrene, α-methyl styrene, vinyl toluene and divinyl benzene. Among these styrene-based monomers, more preferred are styrene and α-methyl styrene.

Specific examples of the preferred aromatic group-containing (meth)acrylate include phenyl (meth)acrylate, benzyl (meth)acrylate, phenoxyethyl (meth)acrylate and the like. Among these aromatic group-containing (meth)acrylates, more preferred is benzyl (meth)acrylate.

As the hydrophobic monomer (b), any two or more of the aforementioned monomers may be used in combination, and the styrene-based monomer may also be used in combination with the aromatic group-containing (meth)acrylic acid ester.

[(c) Macromonomer]

The macromonomer (c) is in the form of a compound containing a polymerizable functional group at one terminal end thereof and having a number-average molecular weight of not less than 500 and not more than 100,000, and may be used as a monomer component of the water-insoluble polymer from the viewpoint of improving storage stability of the pigment-containing polymer particles in the pigment water dispersion. The polymerizable functional group bonded to one terminal end of the macromonomer is preferably an acryloyloxy group or a methacryloyloxy group and more preferably a methacryloyloxy group.

The macromonomer (c) preferably has a number-average molecular weight of not less than 1,000 and not more than 10,000. Meanwhile, the number-average molecular weight of the macromonomer (c) may be measured by gel permeation chromatography using chloroform containing 1 mmol/L of dodecyl dimethylamine as a solvent and using polystyrenes as a reference standard substance.

As the macromonomer (c), from the viewpoint of improving storage stability of the pigment-containing polymer particles in the pigment water dispersion, there are preferably used an aromatic group-containing monomer-based macromonomer and a silicone-based macromonomer. Among these macromonomers, more preferred is the aromatic group-containing monomer-based macromonomer.

Examples of an aromatic group-containing monomer constituting the aromatic group-containing monomer-based macromonomer include those aromatic group-containing monomers as described previously with respect to the aforementioned hydrophobic vinyl monomer (b). Among these aromatic group-containing monomers, preferred are styrene and benzyl (meth)acrylate, and more preferred is styrene.

Specific examples of the styrene-based macromonomer include "AS-6(S)", "AN-6(S)" and "HS-6(S)" (tradenames) all available from Toagosei Co., Ltd., etc.

Specific examples of the silicone-based macromonomer include organopolysiloxanes containing a polymerizable functional group bonded to one terminal end thereof, etc.

[(d) Nonionic Monomer]

From the viewpoint of improving storage stability of the pigment-containing polymer particles in the pigment water dispersion, it is preferred that (d) a nonionic monomer is further used as a monomer component of the water-insoluble polymer.

Examples of the nonionic monomer (d) include 2-hydroxyethyl (meth)acrylate, 3-hydroxypropyl (meth)acrylate, a polyalkylene glycol (meth)acrylate such as polypropylene glycol (n=2 to 30 wherein n represents an average molar number of addition of oxyalkylene groups: hereinafter defined in the same way) (meth)acrylate and polyethylene glycol (n=2 to 30) (meth) acrylate, an alkoxy polyalkylene glycol (meth)acrylate such as methoxy polyethylene glycol (n=1 to 30) (meth)acrylate, phenoxy (ethylene glycol/propylene glycol copolymer) (n=1 to 30 in which n for ethylene glycol is 1 to 29) (meth)acrylate, and the like. Among these nonionic monomers, preferred are polypropylene glycol (n=2 to 30) (meth)acrylate and phenoxy (ethylene glycol/ propylene glycol copolymer) (meth)acrylate, and more preferred is polypropylene glycol (n=2 to 30) (meth)acrylate.

Specific examples of commercially available products of the component (d) include "NK ESTER M-20G", "NK ESTER M-40G", "NK ESTER M-90G", "NK ESTER M-230G" and the like all available from Shin-Nakamura Chemical Co., Ltd.; and "BLEMMER PE-90", "BLEMMER PE-200", "BLEMMER PE-350" and the like, "BLEMMER PME-100", "BLEMMER PME-200", "BLEMMER PME-400" and the like, "BLEMMER PP-500", "BLEMMER PP-800", "BLEMMER PP-1000" and the like, "BLEMMER AP-150", "BLEMMER AP-400", "BLEMMER AP-550" and the like, and "BLEMMER 50PEP-300", "BLEMMER 50POEP-800B", "BLEMMER 43PAPE-600B" and the like all available from NOF Corporation, etc.

The aforementioned components (a) to (d) may be respectively used alone or in the form of a mixture of any two or more thereof.

As described above, the carboxy group-containing water-insoluble polymer used in the present invention is preferably the vinyl-based polymer containing a constitutional unit derived from the at least one carboxy group-containing vinyl monomer (a) selected from the group consisting of acrylic acid and methacrylic acid and a constitutional unit derived from the at least one hydrophobic vinyl monomer (b) selected from the group consisting of an acrylate monomer, a methacrylate monomer and an aromatic group-containing monomer. In addition, the carboxy group-containing water-insoluble polymer may also be in the form of a vinyl-based polymer that further contains a constitutional unit derived from the macromonomer (c) and a constitutional unit derived from the nonionic monomer (d).

(Contents of Respective Components in Monomer Mixture or Contents of Respective Constitutional Units in Polymer)

The contents of the aforementioned components (a) to (d) in the monomer mixture (contents of non-neutralized components; hereinafter defined in the same way) upon production of the water-insoluble polymer, i.e., the contents of the constitutional units derived from the respective components in the water-insoluble polymer are as follows, from the viewpoint of improving storage stability of the pigment water dispersion.

The content of the component (a) is preferably not less than 8% by mass, more preferably not less than 10% by mass and even more preferably not less than 12% by mass, and is also preferably not more than 60% by mass, more preferably not more than 50% by mass and even more preferably not more than 45% by mass.

The content of the component (b) is preferably not less than 15% by mass, more preferably not less than 20% by mass and even more preferably not less than 25% by mass, and is also preferably not more than 80% by mass, more preferably not more than 70% by mass and even more preferably not more than 60% by mass.

In the case where the component (c) is included, the content of the component (c) is preferably not less than 5% by mass, more preferably not less than 8% by mass and even more preferably not less than 10% by mass, and is also preferably not more than 30% by mass, more preferably not more than 25% by mass and even more preferably not more than 20% by mass.

In the case where the component (d) is included, the content of the component (d) is preferably not less than 5% by mass, more preferably not less than 8% by mass and even more preferably not less than 10% by mass, and is also preferably not more than 35% by mass, more preferably not more than 30% by mass and even more preferably not more than 25% by mass.

The mass ratio of the component (a) to the component (b) [component (a)/component (b)] is preferably not less than 0.1, more preferably not less than 0.15 and even more preferably not less than 0.18, and is also preferably not more than 2.0, more preferably not more than 1.8 and even more preferably not more than 1.5.

In addition, in the case where the component (c) is included, the mass ratio of the component (a) to a sum of the component (b) and the component (c) [component (a)/[component (b)+component (c)]] is preferably not less than 0.1, more preferably not less than 0.12 and even more preferably not less than 0.15, and is also preferably not more than 2.0, more preferably not more than 1.5 and even more preferably not more than 1.2.

(Production of Water-Insoluble Polymer)

The water-insoluble polymer may be produced by copolymerizing the aforementioned monomer mixture by known polymerization methods such as a bulk polymerization method, a solution polymerization method, a suspension polymerization method and an emulsion polymerization method. Among these polymerization methods, preferred is the solution polymerization method.

The solvent used in the solution polymerization method is not particularly limited, and is preferably an organic polar solvent. If the organic polar solvent is miscible with water, the organic solvent may be used in the form of a mixture with water. Examples of the organic polar solvents include aliphatic alcohols having 1 to 3 carbon atoms; ketones having 3 to 5 carbon atoms; ethers; and esters such as ethyl acetate. Among these organic polar solvents, preferred is methanol, ethanol, acetone, methyl ethyl ketone or a mixed solvent of at least one of these compounds with water, and more preferred is methyl ethyl ketone or a mixed solvent of methyl ethyl ketone and water.

The polymerization may be carried out in the presence of a polymerization initiator or a chain transfer agent.

Examples of the polymerization initiator include conventionally known radical polymerization initiators, e.g., azo compounds such as 2,2'-azobisisobutyronitrile and 2,2'-azobis(2,4-dimethylvaleronitrile), and organic peroxides such as tert-butyl peroxyoctoate and benzoyl peroxide. The amount of the radical polymerization initiator used in the polymerization reaction is preferably 0.001 to 5 mol and more preferably 0.01 to 2 mol per 1 mol of the monomer mixture.

Examples of the chain transfer agent include conventionally known chain transfer agents, e.g., mercaptans such as octyl mercaptan and 2-mercaptoethanol, and thiuram disulfides.

In addition, the type of a polymerization chain of the monomers to be polymerized is not particularly limited, and may be any polymerization type selected from a random type, a block type and a graft type, etc.

The preferred polymerization conditions may vary depending upon the kinds of polymerization initiators, monomers and solvents used, etc. In general, the polymerization temperature is preferably not lower than 30° C. and more preferably not lower than 50° C., and is also preferably not higher than 95° C. and more preferably not higher than 80° C. The polymerization time is preferably not less than 1 hour and more preferably not less than 2 hours, and is also preferably not more than 20 hours and more preferably not more than 10 hours. Furthermore, the polymerization is preferably conducted in a nitrogen gas atmosphere or in an atmosphere of an inert gas such as argon.

After completion of the polymerization reaction, the polymer produced may be isolated from the obtained reaction solution by known methods such as reprecipitation and removal of the solvent by distillation. In addition, the resulting polymer may be purified by removing the unreacted monomers, etc., from the reaction solution by reprecipitation, membrane separation, chromatography, extraction, etc.

The solid content of the water-insoluble polymer solution is preferably not less than 30% by mass and more preferably not less than 40% by mass, and is also preferably not more than 70% by mass and more preferably not more than 65% by mass, from the viewpoint of enhancing productivity of the water dispersion of the pigment-containing polymer particles.

The number-average molecular weight of the water-insoluble polymer used in the present invention is preferably not less than 2,000 and more preferably not less than 5,000, and is also preferably not more than 20,000 and more preferably not more than 18,000, from the viewpoint of improving an adsorption force of the polymer to the pigment and well exhibiting dispersion stability of the pigment. In addition, the weight-average molecular weight of the water-insoluble polymer used in the present invention is preferably not less than 6,000 and more preferably not less than 8,000, and is also preferably not more than 80,000 and more preferably not more than 40,000.

Meanwhile, the number-average molecular weight of the polymer may be measured by the method described in Examples below.

(Dispersion of Pigment)

In the present invention, after dispersing the pigment with the polymer before being crosslinked, the polymer may be subjected to crosslinking reaction. Alternatively, the pigment may be dispersed with the crosslinked polymer. As the method of dispersing the pigment with the polymer, there may be used optional conventionally known methods. The formaldehyde-releasing compound may be compounded at any optional stage before and after the crosslinking reaction.

The pigment and the crosslinked polymer are preferably used in the form of pigment-containing polymer particles from the viewpoint of improving storage stability of the pigment water dispersion.

In addition, in the case where the water-insoluble polymer is used as the polymer before being crosslinked, from the viewpoint of enhancing productivity of the water dispersion of the pigment-containing polymer particles, the water-insoluble polymer is preferably used in the form of a water-insoluble polymer solution without removing an organic solvent used in the polymerization reaction for production of the polymer in order to use the organic solvent contained therein as an organic solvent used in the below-mentioned step 1.

[Production of Pigment-Containing Polymer Particles]

Upon production of the pigment-containing polymer particles, the water-insoluble polymer is preferably used as the polymer before being crosslinked. For example, the crosslinked polymer particles containing the pigment (pigment-containing polymer particles) can be efficiently produced in the form of an aqueous pigment dispersion liquid by the process including the following steps 1 to 3.

Step 1; subjecting a mixture containing the carboxy group-containing water-insoluble polymer, an organic solvent, the pigment and water, if required together with a neutralizing agent (hereinafter also referred to merely as a "pigment mixture") to dispersion treatment to obtain a dispersion liquid of the pigment-containing water-insoluble polymer particles;

Step 2: removing the organic solvent from the dispersion liquid obtained in the step 1 to obtain a water dispersion liquid of the pigment-containing water-insoluble polymer particles (hereinafter also referred to merely as a "water-based pigment dispersion liquid"); and Step 3: subjecting the water-based pigment dispersion liquid obtained in the step 2 to crosslinking treatment with a crosslinking agent to obtain an aqueous pigment dispersion liquid containing the pigment-containing crosslinked water-insoluble polymer particles (pigment-containing polymer particles) (hereinafter also referred to merely as an "aqueous pigment dispersion liquid").

Meanwhile, in the case where the water-soluble polymer is used as the polymer to be treated in the step 1, it is possible to obtain the crosslinked polymer particles by conducting the step 3 similarly according to the above-exemplified method using the water-insoluble polymer.

(Step 1)

The step 1 is the step of subjecting a mixture (pigment mixture) containing the carboxy group-containing water-insoluble polymer, an organic solvent, the pigment and water, if required together with a neutralizing agent to dispersion treatment to obtain a dispersion liquid of the pigment-containing water-insoluble polymer particles.

The order of mixing of the respective components in the step 1 is not particularly limited. However, there is preferably used the method in which the water-insoluble polymer is first dissolved in the organic solvent, and then the neutralizing agent, water and the pigment, and further if required the surfactant, etc., are successively added to the resulting organic solvent solution in this order, followed by mixing the resulting mixture, to thereby obtain a dispersion liquid of an oil-in-water type.

The organic solvent used in the step 1 is not particularly limited, and is preferably selected from aliphatic alcohols having 1 to 3 carbon atoms, ketones, ethers, esters and the like. Of these organic solvents, from the viewpoints of improving wettability to the pigment, solubility of the water-insoluble polymer therein and adsorption of the water-insoluble polymer onto the pigment, more preferred are ketones having not less than 4 and not more than 8 carbon atoms, even more preferred are acetone, methyl ethyl ketone and methyl isobutyl ketone, and further even more preferred is methyl ethyl ketone.

When the water-insoluble polymer is synthesized by a solution polymerization method, the solvent used in the solution polymerization method may be directly used as such in the step 1.

(Neutralization)

It is preferred that the carboxyl groups contained in the water-insoluble polymer are at least partially neutralized using a neutralizing agent, preferably an alkali metal compound. The pH value of the resulting dispersion liquid is preferably not less than 5.5 and more preferably not less than 6 from the viewpoint of improving handling properties for suppression of skin irritation, etc., and is also preferably not more than 13, more preferably not more than 12 and even more preferably not more than 11 from the viewpoint of suppressing corrosion of members.

The alkali metal compound as the neutralizing agent is a compound that is capable of forming an alkali metal ion in water or an aqueous medium used in the water-based pigment dispersion liquid, etc. Examples of the alkali metal compound include alkali metal hydroxides such as lithium hydroxide, sodium hydroxide, potassium hydroxide and cesium hydroxide; alkali metal salts of silicic acid such as sodium orthosilicate, sodium metasilicate and sodium sesquisilicate; alkali metal salts of phosphoric acid such as trisodium phosphate; alkali metal salts of carbonic acid such as disodium carbonate, sodium hydrogencarbonate and dipotassium carbonate; alkali metal salts of boric acid such as sodium borate; and the like. These alkali metal compounds may be used in combination of any two or more thereof. Of these alkali metal compounds, preferred are alkali metal hydroxides, and more preferred are sodium hydroxide and potassium hydroxide. Also, the water-insoluble polymer may be previously neutralized.

The neutralizing agent is preferably used in the form of an aqueous neutralizing agent solution from the viewpoint of sufficiently and uniformly accelerating the neutralization of the carboxy groups of the water-insoluble polymer. From the same viewpoint as described above, the concentration of the aqueous neutralizing agent solution is preferably not less than 3% by mass, more preferably not less than 10% by mass and even more preferably not less than 15% by mass, and is also preferably not more than 50% by mass and more preferably not more than 25% by mass.

In addition, the alkali metal compound may be used in combination with a volatile basic compound such as ammonia.

The neutralization degree of the carboxy groups of the water-insoluble polymer is preferably not less than 15 mol %, more preferably not less than 20 mol % and even more preferably not less than 25 mol %, and is also preferably not more than 80 mol %, more preferably not more than 70 mol %, even more preferably not more than 60 mol % and further even more preferably not more than 50 mol %, from the viewpoint of improving storage stability of the resulting aqueous pigment dispersion liquid.

The neutralization degree as used herein means a percent ratio (mol %) calculated by dividing a mole equivalent number of the neutralizing agent (alkali metal compound) by a mole equivalent number of the carboxy groups of the water-insoluble polymer, i.e., a percent ratio (mol %) expressed by the formula of [(mole equivalent number of neutralizing agent (alkali metal compound))/(mole equivalent number of carboxy groups of water-insoluble polymer)].

(Contents of Respective Components in Pigment Mixture)

The contents of the respective components in the pigment mixture are as follows from the viewpoint of improving storage stability of the resulting aqueous pigment dispersion liquid.

The content of the pigment in the pigment mixture used in the step 1 is preferably not less than 5% by mass, more preferably not less than 10% by mass and even more preferably not less than 12.5% by mass, and is also preferably not more than 35% by mass, more preferably not more than 30% by mass and even more preferably not more than 20% by mass.

The content of the water-insoluble polymer in the pigment mixture is preferably not less than 1% by mass, more preferably not less than 2% by mass and even more preferably not less than 3% by mass, and is also preferably not more than 8% by mass, more preferably not more than 7% by mass and even more preferably not more than 6% by mass.

The content of the organic solvent in the pigment mixture is preferably not less than 4% by mass, more preferably not less than 5% by mass and even more preferably not less than 6% by mass, and is also preferably not more than 30% by mass, more preferably not more than 20% by mass and even more preferably not more than 15% by mass.

The content of water in the pigment mixture is preferably not less than 40% by mass, more preferably not less than 45% by mass and even more preferably not less than 50% by mass, and is also preferably not more than 90% by mass, more preferably not more than 85% by mass and even more preferably not more than 80% by mass.

The mass ratio of the pigment to the water-insoluble polymer [pigment/water-insoluble polymer] in the pigment mixture is preferably not less than 0.5, more preferably not less than 1.0 and even more preferably not less than 2.0, and is also preferably not more than 6.0, more preferably not more than 5.0 and even more preferably not more than 4.5, from the viewpoint of improving storage stability of the resulting aqueous pigment dispersion liquid.

(Dispersion Treatment of Pigment Mixture)

In the step 1, the aforementioned pigment mixture is subjected to dispersion treatment to obtain a dispersion liquid of the pigment-containing water-insoluble polymer particles. The dispersing method for obtaining the dispersion liquid is not particularly limited. The pigment particles may be atomized into fine particles having a desired average particle size only by substantial dispersion treatment. However, it is preferred that the pigment mixture is first subjected to preliminary dispersion treatment, and then further subjected to the substantial dispersion treatment by applying a shear stress thereto so as to control the average particle size of the obtained pigment particles to a desired value.

The temperature used in the step 1, in particular, the temperature used in the preliminary dispersion treatment, is preferably not lower than 0° C., and is also preferably not higher than 40° C., more preferably not higher than 30° C. and even more preferably not higher than 25° C. The dispersing time is preferably not less than 0.5 hour and more preferably not less than 0.8 hour, and is also preferably not more than 30 hours, more preferably not more than 10 hours and even more preferably not more than 5 hours.

When subjecting the pigment mixture to the preliminary dispersion treatment, there may be employed ordinary mixing and stirring devices such as anchor blades and disper blades. Of these devices, preferred are high-speed stirring mixers.

As a means for applying a shear stress to the pigment mixture in the substantial dispersion treatment, there may be used, for example, kneading machines such as roll mills and kneaders, high-pressure homogenizers such as "MICROFLUIDIZER" available from Microfluidics Corporation, and media-type dispersers such as paint shakers and beads mills. Examples of the commercially available media-type dispersers include "Ultra Apex Mill" available from Kotobuki Industries Co., Ltd., and "Pico Mill" available from Asada Iron Works Co., Ltd. These devices may be used in combination of any two or more thereof. Among these devices, the high-pressure homogenizers are preferably used from the viewpoint of reducing a particle size of the pigment.

In the case where the substantial dispersion treatment is conducted using the high-pressure homogenizer, the particle size of the pigment can be adjusted to a desired value by controlling the treating pressure and the number of passes.

The treating pressure used in the substantial dispersion treatment is preferably not less than 60 MPa, more preferably not less than 100 MPa and even more preferably not less than 130 MPa, and is also preferably not more than 200 MPa and more preferably not more than 180 MPa, from the viewpoint of enhancing productivity and cost efficiency.

Also, the number of passes through the homogenizer used in the substantial dispersion treatment is preferably not less than 3 and more preferably not less than 10, and is also preferably not more than 30 and more preferably not more than 25.

(Step 2)

The step 2 is the step of removing the organic solvent from the dispersion liquid obtained in the step 1 to obtain a water dispersion liquid of the pigment-containing water-insoluble polymer particles (hereinafter also referred to merely as a "water-based pigment dispersion liquid").

In the step 2, by removing the organic solvent from the dispersion liquid obtained in the step 1 by any conventionally known methods, it is possible to obtain the water-based pigment dispersion liquid. The organic solvent is preferably substantially completely removed from the thus obtained water-based pigment dispersion liquid. However, the residual organic solvent may be present in the water-based pigment dispersion liquid unless the objects and advantageous effects of the present invention are adversely affected by the residual organic solvent. The content of the residual organic solvent in the water-based pigment dispersion liquid is preferably not more than 0.1% by mass and more preferably not more than 0.01% by mass.

In addition, if required, the dispersion liquid may be subjected to heating and stirring treatments before removing the organic solvent therefrom by distillation.

In the thus-obtained water-based pigment dispersion liquid, the pigment-containing water-insoluble polymer particles are dispersed in a dispersing medium containing water as a main medium. The configuration of the pigment-containing water-insoluble polymer particles in the water-based pigment dispersion liquid is not particularly limited, and the pigment-containing water-insoluble polymer particles may have any configuration as long as the particles are formed of at least the pigment and the water-insoluble polymer. As described above, the particle configuration in which the pigment is enclosed or encapsulated in the water-insoluble polymer is preferred.

The concentration of non-volatile components in the resulting water-based pigment dispersion liquid (solid content of the water-based pigment dispersion liquid) is preferably not less than 10% by mass and more preferably not less than 15% by mass, and is also preferably not more than 30% by mass and more preferably not more than 25% by mass, from the viewpoint of improving storage stability of the water-based pigment dispersion liquid.

Meanwhile, the solid content of the water-based pigment dispersion liquid may be measured by the method described in Examples below.

The average particle size of the pigment-containing water-insoluble polymer particles in the water-based pigment dispersion liquid is preferably not less than 50 nm, more preferably not less than 60 nm and even more preferably not less than 70 nm, and is also preferably not more than 200 nm, more preferably not more than 160 nm and even more preferably not more than 120 nm, from the viewpoints of suppressing formation of coarse particles and improving storage stability of the resulting aqueous pigment dispersion liquid.

(Step 3)

The step 3 is the step of subjecting the water-based pigment dispersion liquid obtained in the step 2 to crosslinking treatment with a crosslinking agent to obtain an aqueous pigment dispersion liquid containing the pigment-containing crosslinked polymer particles (pigment-containing polymer particles).

In the step 3, from the viewpoint of improving storage stability of the resulting aqueous pigment dispersion liquid under high-temperature conditions, the water-based pigment dispersion liquid obtained in the step 2 is subjected to crosslinking treatment with a crosslinking agent, preferably the below-mentioned polyfunctional epoxy compound to obtain the aqueous pigment dispersion liquid containing the pigment-containing polymer particles. In this step, the carboxy groups contained in the water-insoluble polymer constituting the pigment-containing polymer particles are partially crosslinked to form a crosslinked structure in a surface layer portion of the respective pigment-containing polymer particles.

More specifically, the crosslinked polymer according to the present invention is obtained by subjecting the water-insoluble polymer and the crosslinking agent (polyfunctional epoxy compound) to crosslinking reaction on the surface of the pigment, so that the water-insoluble polymer contained in the pigment-containing polymer particles in the water-based pigment dispersion liquid is crosslinked with the crosslinking agent (polyfunctional epoxy compound) and converted into the crosslinked water-insoluble polymer to thereby obtain the aqueous pigment dispersion liquid that is formed by dispersing the pigment in an aqueous medium with the crosslinked polymer.

(Polyfunctional Epoxy Compound)

The polyfunctional epoxy compound used as the crosslinking agent is preferably a water-insoluble polyfunctional epoxy compound whose solubility in water as measured by dissolving the epoxy compound in 100 g of water at 20° C. is preferably not more than 55 g, more preferably not more than 44 g and even more preferably not more than 39 g, from the viewpoint of efficiently crosslinking the epoxy compound with the carboxy groups contained in the water-insoluble polymer in the dispersing medium containing water as a main component.

In addition, from the viewpoint of improving storage stability of the resulting aqueous pigment dispersion liquid under high-temperature conditions, the water solubility rate of the polyfunctional epoxy compound is preferably not more than 50% by mass, more preferably not more than 40% by mass and even more preferably not more than 35% by mass.

The "water solubility rate (% by mass)" as used herein means a rate (% by mass) of dissolution of the polyfunctional epoxy compound as measured by dissolving 10 parts by mass of the epoxy compound in 90 parts by mass of water at room temperature (25° C.). More specifically, the water solubility rate may be measured by the method described in Examples below.

The polyfunctional epoxy compound is a compound containing two or more epoxy groups in a molecule thereof, more preferably a glycidyl ether group-containing compound, and even more preferably a glycidyl ether compound of a polyhydric alcohol containing a hydrocarbon group having not less than 3 and not more than 8 carbon atoms.

The molecular weight of the polyfunctional epoxy compound is preferably not less than 120, more preferably not less than 150 and even more preferably not less than 200, and is also preferably not more than 2000, more preferably not more than 1500 and even more preferably not more than 1000, from the viewpoint of facilitating the crosslinking reaction and improving storage stability of the resulting crosslinked polymer.

The number of epoxy groups contained in the polyfunctional epoxy compound is not less than 2 and preferably not less than 3 per a molecule of the epoxy compound, and is also preferably not more than 6 per a molecule of the epoxy compound, from the viewpoint of efficiently crosslinking the epoxy compound with the carboxy groups of the water-insoluble polymer to thereby enhance storage stability of the resulting pigment-containing polymer particles, etc. Since the polyfunctional epoxy compounds containing not less than 5 epoxy groups in a molecule thereof are less available in the market, the use of those polyfunctional epoxy compounds containing 3 or 4 epoxy groups in a molecule thereof is more preferable from the viewpoint of meeting both requirements of high reactivity and good cost efficiency.

From the same viewpoint as described above, the epoxy equivalent of the polyfunctional epoxy compound is preferably not less than 100, more preferably not less than 110 and even more preferably not less than 120, and is also preferably not more than 300, more preferably not more than 270 and even more preferably not more than 250.

Specific examples of the insoluble polyfunctional epoxy compound include polyglycidyl ethers such as polypropylene glycol diglycidyl ether, glycerin polyglycidyl ether, glycerol polyglycidyl ether, polyglycerol polyglycidyl ether, trimethylolpropane polyglycidyl ether, sorbitol polyglycidyl ether, pentaerythritol polyglycidyl ether, resorcinol diglycidyl ether, neopentyl glycol diglycidyl ether and hydrogenated bisphenol A-type diglycidyl ethers.

Of these insoluble polyfunctional epoxy compounds, preferred is at least one compound selected from the group consisting of polypropylene glycol diglycidyl ether (water solubility rate: 31% by mass), trimethylolpropane polyglycidyl ether (water solubility rate: 27% by mass) and pentaerythritol polyglycidyl ether (water solubility rate: less than 20% by mass).

(Crosslinking Reaction)

In the present invention, it is preferred that the carboxy groups contained in the water-insoluble polymer are partially neutralized with the alkali metal compound for dispersing the pigment, and then a part of the carboxy groups contained in the water-insoluble polymer are further reacted with the polyfunctional epoxy compound to form a crosslinked structure therein, thereby obtaining the aqueous pigment dispersion liquid in which the pigment is dispersed in an aqueous medium using the crosslinked polymer produced in the reaction system.

From the viewpoint of completing the crosslinking reaction and attaining good cost efficiency, the temperature used in the crosslinking reaction is preferably not lower than 40° C., more preferably not lower than 50° C., even more preferably not lower than 55° C., further even more preferably not lower than 60° C. and still further even more preferably not lower than 65° C., and is also preferably not higher than 95° C. and more preferably not higher than 90° C.

In addition, from the same viewpoint as described above, the time of the crosslinking reaction is preferably not less than 0.5 hour, more preferably not less than 1 hour, even more preferably not less than 1.5 hours and further even more preferably not less than 3.0 hours, and is also preferably not more than 12 hours, more preferably not more than 10 hours, even more preferably not more than 8.0 hours and further even more preferably not more than 6 hours.

The crosslinking degree of the water-insoluble polymer is preferably not less than 5 mol % and more preferably not less than 8 mol %, and is also preferably not more than 60 mol %, more preferably not more than 50 mol %, even more preferably not more than 40 mol %, further even more preferably not more than 30 mol % and still further even more preferably not more than 20 mol %. The crosslinking degree of the water-insoluble polymer is an apparent crosslinking degree calculated from an acid value of the polymer and an equivalent amount of the epoxy groups of the crosslinking agent, i.e., the crosslinking degree is expressed by a percent ratio (mol %) of a mole equivalent number of the epoxy groups of the polyfunctional epoxy compound to a mole equivalent number of the carboxy groups of the water-insoluble polymer [(mole equivalent number of epoxy groups of polyfunctional epoxy compound)/(mole equivalent number of carboxy groups of water-insoluble polymer)].

The pH value of the resulting aqueous pigment dispersion liquid is preferably not less than 8.0. When the pH value of the aqueous pigment dispersion liquid is not less than 8.0, dissociation of the anionic groups from the polymer is promoted, and the amount of electric charge present in the aqueous pigment dispersion liquid is sufficient, so that the resulting aqueous pigment dispersion liquid can be enhanced in storage stability. The pH value of the aqueous pigment dispersion liquid is more preferably not less than 8.5. The upper limit of the pH value of the aqueous pigment dispersion liquid is not particularly limited. However, if the pH value of the aqueous pigment dispersion liquid is more than 11, the pH value of an ink obtained using the aqueous pigment dispersion liquid tends to become excessively high, so that associated members or parts of a printer tend to be adversely influenced thereby. For this reason, the pH value of the aqueous pigment dispersion liquid is more preferably not more than 10.5.

[Production of Pigment Water Dispersion]

The pigment water dispersion of the present invention can be produced by the method in which after producing the aqueous pigment dispersion liquid (aqueous pigment dispersion liquid) containing the pigment-containing crosslinked water-insoluble polymer particles (pigment-containing polymer particles) according to the process including the aforementioned steps 1 to 3, or preferably after mixing the carboxy group-containing water-soluble polymer having an acid value of not less than 170 mgKOH/g and not more than 380 mgKOH/g with the pigment and then subjecting the obtained mixture to crosslinking treatment, a formaldehyde-releasing compound is compounded in the resulting dispersion liquid.

In addition, the pigment water dispersion may be further compounded, if required, with water, as well as various additives that may be usually used therein, e.g., a surfactant such as a nonionic surfactant and the like, a pH controller such as amines and the like, a chelating agent, a wetting agent, a penetrant, a dispersant, a viscosity controller, a defoaming agent, a rust preventive and an antioxidant, etc. Furthermore, the resulting pigment water dispersion may be subjected to filtration treatment through a filter, etc.

<Formaldehyde-Releasing Compound>

The pigment water dispersion of the present invention contains a formaldehyde-releasing compound. As the formaldehyde-releasing compound, there may be used a formaldehyde-releasing antiseptic agent. From the viewpoint of the improving storage stability of the resulting pigment water dispersion, the formaldehyde-releasing compound may be used singly in the pigment water dispersion. However, from the viewpoint of improving antiseptic properties and/or antifungal properties of the resulting pigment water dispersion, the formaldehyde-releasing compound may be used in combination with the other antiseptic agent.

Examples of the formaldehyde-releasing compound include formaldehyde, paraformaldehyde, alkanolamines, glycols, urea and condensation products of urea derivatives.

Of these compounds, preferred are those formaldehyde-releasing compounds having a hetero ring skeleton containing a nitrogen atom, more specifically, preferred is at least one compound selected from the group consisting of a triazine compound and a hydantoin compound, and more preferred is at least one compound selected from the group consisting of 1,3,5-triazine-1,3,5-(2H, 4H, 6H)-tris(ethanon, 1,3-bis(hydroxymethyl)-5,5-dimethyl hydantoin and cis-1-(3-chloroallyl)-3,5,7-triaza-1-azonia adamantane chloride.

Incidentally, the triazine compound as used herein means a compound having a triazine skeleton or a skeleton induced from triazine (for example, such as cyclotrimethylenetriamine, 3,5,7-triaza-1-azonia adamantane and the like), and the hydantoin compound as used herein means a compound having a hydantoin skeleton or a skeleton induced from hydantoin.

<Contents of Respective Components in Pigment Water Dispersion>

(Content of Pigment)

The content of the pigment in the pigment water dispersion is preferably not less than 2% by mass, more preferably not less than 5% by mass and even more preferably not less than 10% by mass, and is also preferably not more than 25% by mass, more preferably not more than 20% by mass and even more preferably not more than 18% by mass, from the viewpoint of improving storage stability of the pigment water dispersion.

(Content of Crosslinked Polymer)

The content of the crosslinked polymer in the pigment water dispersion is preferably not less than 1% by mass and more preferably not less than 3% by mass, and is also preferably not more than 8% by mass and more preferably not more than 6% by mass, from the viewpoint of improving storage stability of the pigment water dispersion.

(Total Content of Pigment and Crosslinked Polymer)

The total content of the pigment and the crosslinked polymer in the pigment water dispersion, in particular, the total content of the pigment and the water-insoluble polymer in the pigment water dispersion, is preferably not less than 2% by mass, more preferably not less than 5% by mass, even more preferably not less than 10% by mass and further even more preferably not less than 15% by mass, and is also preferably not more than 30% by mass, more preferably not more than 28% by mass, even more preferably not more than 25% by mass and further even more preferably not more than 23% by mass, from the viewpoint of improving storage stability of the pigment water dispersion.

(Mass Ratio of Pigment to Crosslinked Polymer)

The mass ratio of the pigment to the crosslinked polymer (pigment/crosslinked polymer) is preferably not less than 0.8, more preferably not less than 1.3 and even more preferably not less than 1.8, and is also preferably not more than 5, more preferably not more than 4.5, even more preferably not more than 4.2 and further even more preferably not more than 3.5, from the viewpoint of improving storage stability of the pigment water dispersion.

(Content of Formaldehyde-Releasing Compound)

The content of the formaldehyde-releasing compound in the pigment water dispersion is preferably not less than 30 ppm and more preferably not less than 50 ppm from the viewpoint of improving storage stability of the pigment water dispersion, and even more preferably not less than 100 ppm, further even more preferably not less than 150 ppm, still further even more preferably not less than 170 ppm and furthermore preferably not less than 190 ppm from the viewpoint of sufficiently exhibiting antiseptic and antifungal effects, and is also preferably not more than 1500 ppm, more preferably not more than 1000 ppm and even more preferably not more than 800 ppm from the viewpoint of improving storage stability of the pigment water dispersion.

(Mass Ratio of Formaldehyde-Releasing Compound to Crosslinked Polymer)

The mass ratio of the formaldehyde-releasing compound to the crosslinked polymer (formaldehyde-releasing compound/crosslinked polymer) in the pigment water dispersion is preferably not less than 0.001 from the viewpoint of improving storage stability of the pigment water dispersion, and more preferably not less than 0.002, even more preferably not less than 0.003, further even more preferably not less than 0.005 and still further even more preferably not less than 0.01 from the viewpoint of sufficiently exhibiting antiseptic and antifungal effects, and is also preferably not more than 0.05, more preferably not more than 0.04 and even more preferably not more than 0.03 from the viewpoint of improving storage stability of the pigment water dispersion.

(Content of Water)

The content of water in the pigment water dispersion is preferably not less than 50% by mass, more preferably not less than 60% by mass and even more preferably not less than 70% by mass, and is also preferably not more than 90% by mass, more preferably not more than 85% by mass and even more preferably not more than 82% by mass, from the viewpoint of improving storage stability of the pigment water dispersion. Meanwhile, as the water used in the pigment water dispersion, pure water and ultrapure water such as ion-exchanged water and distilled water are preferred.

(Properties of Pigment Water Dispersion)

The viscosity of the pigment water dispersion as measured at 32° C. is preferably not less than 2 mPa·s, more preferably not less than 3 mPa·s and even more preferably not less than 5 mPa·s, and is also preferably not more than 12 mPa·s, more preferably not more than 9 mPa·s and even more preferably not more than 7 mPa·s, from the viewpoint of further improving storage stability of the resulting pigment water dispersion.

The pH value of the pigment water dispersion is preferably not less than 7.0, more preferably not less than 7.2 and even more preferably not less than 7.5 from the viewpoint of further improving storage stability of the resulting pigment water dispersion, and is also preferably not more than 11.0, more preferably not more than 10.0 and even more preferably 9.5 from the viewpoint of improving resistance of members to the pigment water dispersion and suppressing skin irritation.

The pigment water dispersion of the present invention may be used in an aqueous ink for writing utensils, a water-based ink for ink-jet printing, etc., in particular, can be suitably used as a water-based ink for ink-jet printing.

The ink-jet printing apparatus may be any of a continuous injection type (a charge-controlling type, a spray type, etc.), an on-demand type (a piezoelectric type, a thermal type, an electrostatic attraction type, etc.) and the like. It is more preferred that the pigment water dispersion is used as a water-based ink for ink-jet printing using a piezoelectric type ink-jet printing apparatus.

Examples of the printing medium usable in the present invention include a high-water absorbing plain paper, and a low-water absorbing coated paper and a low-water absorbing film. Specific examples of the coated paper include a versatile glossy coated paper, a multi-color foam glossy coated paper, etc. Specific examples of the film include a polyester film, a polyvinyl chloride film, a polypropylene film, a polyethylene film, etc.

With respect to the aforementioned embodiments, the present invention further provides the following aspects relating to the pigment water dispersion.

<1> A pigment water dispersion containing a pigment, a crosslinked polymer and water, in which the crosslinked polymer is prepared by crosslinking a carboxy group-containing polymer with a crosslinking agent, and has an acid value of not less than 70 mgKOH/g and not more than 300 mgKOH/g; and the pigment water dispersion further contains a formaldehyde-releasing compound.

<2> The pigment water dispersion according to the aspect <1>, wherein the acid value of the crosslinked polymer is preferably not less than 85 mgKOH/g, more preferably not less than 150 mgKOH/g and even more preferably not less than 155 mgKOH/g, and is also preferably not more than 280 mgKOH/g, more preferably not more than 270 mgKOH/g and even more preferably not more than 260 mgKOH/g.

<3> The pigment water dispersion according to the aspect <1> or <2>, wherein the carboxy group-containing polymer is a water-insoluble polymer.

<4> The pigment water dispersion according to any one of the aspects <1> to 30<3>, wherein the carboxy group-containing polymer is an acrylic polymer.

<5> The pigment water dispersion according to the aspect <3> or <4>, wherein an acid value of the water-insoluble polymer is preferably not less than 90 mgKOH/g, more preferably not less than 160 mgKOH/g and even more preferably not less than 170 mgKOH/g, and is also preferably not more than 350 mgKOH/g, more preferably not more than 290 mgKOH/g, even more preferably not more than 280 mgKOH/g and further even more preferably not more than 270 mgKOH/g.

<6> The pigment water dispersion according to any one of the aspects <3> to <5>, wherein the water-insoluble polymer contains a constitutional unit derived from (a) a carboxy group-containing vinyl monomer and a constitutional unit derived from (b) a hydrophobic vinyl monomer, and preferably further contains at least one constitutional unit selected from the group consisting of a constitutional unit derived from (c) a macromonomer and a constitutional unit derived from (d) a nonionic monomer in addition to the aforementioned constitutional units.

<7> The pigment water dispersion according to the aspect <6>, wherein a content of the component (a) is preferably not less than 8% by mass, more preferably not less than 10% by mass and even more preferably not less than 12% by mass, and is also preferably not more than 60% by mass, more preferably not more than 50% by mass and even more preferably not more than 45% by mass.

<8> The pigment water dispersion according to the aspect <6> or <7>, wherein a content of the component (b) is preferably not less than 15% by mass, more preferably not less than 20% by mass and even more preferably not less than 25% by mass, and is also preferably not more than 80% by mass, more preferably not more than 70% by mass and even more preferably not more than 60% by mass.

<9> The pigment water dispersion according to any one of the aspects <6> to <8>, wherein in the case where the component (c) is included, a content of the component (c) is preferably not less than 5% by mass, more preferably not less than 8% by mass and even more preferably not less than 10% by mass, and is also preferably not more than 30% by mass, more preferably not more than 25% by mass and even more preferably not more than 20% by mass.

<10> The pigment water dispersion according to any one of the aspects <6> to <9>, wherein in the case where the component (d) is included, a content of the component (d) is preferably not less than 5% by mass, more preferably not less than 8% by mass and even more preferably not less than 10% by mass, and is also preferably not more than 35% by mass, more preferably not more than 30% by mass and even more preferably not more than 25% by mass.

<11> The pigment water dispersion according to any one of the aspects <6> to <10>, wherein a mass ratio of the component (a) to the component (b) [component (a)/component (b)] is preferably not less than 0.1, more preferably not less than 0.15 and even more preferably not less than 0.18, and is also preferably not more than 2.0, more preferably not more than 1.8 and even more preferably not more than 1.5.

<12> The pigment water dispersion according to any one of the aspects <6> to <11>, wherein in the case where the component (c) is included, a mass ratio of the component (a) to a sum of the component (b) and the component (c) [component (a)/[component (b)+component (c)]] is preferably not less than 0.1, more preferably not less than 0.12 and even more preferably not less than 0.15, and is also preferably not more than 2.0, more preferably not more than 1.5 and even more preferably not more than 1.2.

<13> The pigment water dispersion according to any one of the aspects <3> to <12>, wherein a number-average molecular weight of the water-insoluble polymer is preferably not less than 2,000 and more preferably not less than 5,000, and is also preferably not more than 20,000 and more preferably not more than 18,000.

<14> The pigment water dispersion according to any one of the aspects <1> to <13>, wherein the pigment and the crosslinked polymer are present in the form of pigment-containing crosslinked polymer particles.

<15> The pigment water dispersion according to the aspect <14>, wherein the pigment-containing crosslinked polymer particles are produced by a process including the following steps 1 to 3:

Step 1: subjecting a mixture containing a carboxy group-containing water-insoluble polymer, an organic solvent, the pigment and water, if required together with a neutralizing agent, to dispersion treatment to obtain a dispersion liquid of pigment-containing water-insoluble polymer particles;

Step 2: removing the organic solvent from the dispersion liquid obtained in the step 1 to obtain a water dispersion liquid of the pigment-containing water-insoluble polymer particles; and Step 3: subjecting the water-based pigment dispersion liquid obtained in the step 2 to crosslinking treatment with a crosslinking agent to obtain an aqueous pigment dispersion liquid containing pigment-containing crosslinked water-insoluble polymer particles.

<16> The pigment water dispersion according to any one of the aspects <1> to <15>, wherein the crosslinking agent is a polyfunctional epoxy compound.

<17> The pigment water dispersion according to the aspect <16>, wherein the polyfunctional epoxy compound is a compound containing not less than 2 epoxy groups and preferably not less than 3 epoxy groups, and also preferably not more than 6 epoxy groups in a molecule thereof, more preferably a glycidyl ether group-containing compound, and even more preferably a glycidyl ether compound of a polyhydric alcohol containing a hydrocarbon group having not less than 3 and not more than 8 carbon atoms.

<18> The pigment water dispersion according to the aspect <16> or <17>, wherein a molecular weight of the polyfunctional epoxy compound is preferably not less than 120, more preferably not less than 150 and even more preferably not less than 200, and is also preferably not more than 2000, more preferably not more than 1500 and even more preferably not more than 1000.

<19> The pigment water dispersion according to any one of the aspects <16> to <18>, wherein an epoxy equivalent of the polyfunctional epoxy compound is preferably not less than 100, more preferably not less than 110 and even more preferably not less than 120, and is also preferably not more than 300, more preferably not more than 270 and even more preferably not more than 250.

<20> The pigment water dispersion according to any one of the aspects <16> to <19>, wherein the polyfunctional epoxy compound is at least one compound selected from the group consisting of polypropylene glycol diglycidyl ether, trimethylolpropane polyglycidyl ether and pentaerythritol polyglycidyl ether.

<21> The pigment water dispersion according to any one of the aspects <3> to <20>, wherein a crosslinking degree of the water-insoluble polymer is preferably not less than 5 mol % and more preferably not less than 8 mol %, and is also preferably not more than 60 mol %, more preferably not more than 50 mol % and even more preferably not more than 40 mol %.

<22> The pigment water dispersion according to any one of the aspects <1> to <21>, wherein the formaldehyde-releasing compound is preferably a formaldehyde-releasing compound having a hetero ring skeleton containing a nitrogen atom, and more preferably at least one compound selected from the group consisting of a triazine compound and a hydantoin compound.

<23> The pigment water dispersion according to any one of the aspects <1> to <22>, wherein the formaldehyde-releasing compound is at least one compound selected from the group consisting of 1,3,5-triazine-1,3,5-(2H, 4H, 6H)-tris (ethanol), 1,3-bis(hydroxymethyl)-5,5-dimethyl hydantoin and cis-1-(3-chloroallyl)-3,5,7-triaza-1-azonia adamantane chloride.

<24> The pigment water dispersion according to any one of the aspects <1> to <23>, wherein a content of the pigment in the pigment water dispersion is preferably not less than 2% by mass, more preferably not less than 5% by mass and even more preferably not less than 10% by mass, and is also preferably not more than 25% by mass, more preferably not more than 20% by mass and even more preferably not more than 18% by mass.

<25> The pigment water dispersion according to any one of the aspects <1> to <24>, wherein a content of the crosslinked polymer in the pigment water dispersion is preferably not less than 1% by mass and more preferably not less than 3% by mass, and is also preferably not more than 8% by mass and more preferably not more than 6% by mass.

<26> The pigment water dispersion according to any one of the aspects <1> to <25>, wherein a total content of the pigment and the crosslinked polymer in the pigment water dispersion is preferably not less than 2% by mass, more preferably not less than 5% by mass, even more preferably not less than 10% by mass and further even more preferably not less than 15% by mass, and is also preferably not more than 30% by mass, more preferably not more than 28% by mass, even more preferably not more than 25% by mass and further even more preferably not more than 23% by mass.

<27> The pigment water dispersion according to any one of the aspects <1> to <26>, wherein a mass ratio of the pigment to the crosslinked polymer (pigment/crosslinked polymer) is preferably not less than 0.8, more preferably not less than 1.3 and even more preferably not less than 1.8, and is also preferably not more than 5, more preferably not more than 4.5, even more preferably not more than 4.2 and further even more preferably not more than 3.5.

<28> The pigment water dispersion according to any one of the aspects <1> to <27>, wherein a content of the formaldehyde-releasing compound in the pigment water dispersion is preferably not less than 30 ppm, more preferably not less than 50 ppm, even more preferably not less than 100 ppm, further even more preferably not less than 150 ppm, still further even more preferably not less than 170 ppm and furthermore preferably not less than 190 ppm, and is also preferably not more than 1500 ppm, more preferably not more than 1000 ppm and even more preferably not more than 800 ppm.

<29> The pigment water dispersion according to any one of the aspects <1> to <28>, wherein a mass ratio of the formaldehyde-releasing compound to the crosslinked polymer (formaldehyde-releasing compound/crosslinked polymer) in the pigment water dispersion is preferably not less than 0.001, more preferably not less than 0.002, even more preferably not less than 0.003, further even more preferably not less than 0.005 and still further even more preferably not less than 0.01, and is also preferably not more than 0.05, more preferably not more than 0.04 and even more preferably not more than 0.03.

<30> The pigment water dispersion according to any one of the aspects <1> to <29>, wherein a content of water in the pigment water dispersion is preferably not less than 50% by mass, more preferably not less than 60% by mass and even more preferably not less than 70% by mass, and is also preferably not more than 90% by mass, more preferably not more than 85% by mass and even more preferably not more than 82% by mass.

<31> The pigment water dispersion according to any one of the aspects <1> to 5<30>, for ink-jet printing.

EXAMPLES

In the following Preparation Examples, Production Examples, Examples and Comparative Examples, the "part (s)" and "%" indicate "part(s) by mass" and "% by mass", respectively, unless otherwise specified. Meanwhile, various properties were measured by the following methods.

(1) Measurement of Number-Average Molecular Weight of Water-Insoluble Polymer

The number-average molecular weight of the water-insoluble polymer was measured by gel chromatography [GPC apparatus: "HLC-8120GPC" available from Tosoh Corporation; columns: "TSK-GEL, α-M"×2 available from Tosoh Corporation; flow rate: 1 mL/min] using a solution prepared by dissolving phosphoric acid (guaranteed reagent) available from FUJIFILM Wako Pure Chemical Corporation and lithium bromide (reagent) available from Tokyo Chemical Industry Co., Ltd., in N,N-dimethylformamide (for high-performance liquid chromatography) available from FUJI-FILM Wako Pure Chemical Corporation such that concentrations of phosphoric acid and lithium bromide in the resulting solution were 60 mmol/L and 50 mmol/L, respectively, as an eluent, and using monodisperse polystyrenes having previously known molecular weights as a reference standard substance.

(2) Measurement of Acid Values of Polymer Before being Crosslinked and Crosslinked Polymer Two grams of the polymer before being crosslinked or 2 g of the pigment water dispersion obtained after the crosslinking reaction were diluted with 50 g of ion-exchanged water, and 3 mL of a 0.1 N sodium hydroxide solution was added to the resulting diluted solution. Then, 0.1 N hydrochloric acid was gradually added dropwise to the thus obtained mixed solution to measure two inflection points of a pH curve thereof. The number of moles of the acid as calculated from the difference between titers of the 0.1 N hydrochloric acid at the two inflection points corresponds to the number of moles of the carboxylic acid contained in the polymer. The thus measured number of moles of the acid was converted into the acid value.

(3) Measurement of Solid Content of Pigment Water Dispersion

Sodium sulfate dried to constant weight in a desiccator was weighed and charged in an amount of 10.0 g into a 30 mL polypropylene container (φ: 40 mm; height: 30 mm), and about 1.0 g of a sample to be measured was added to the container. The contents of the container were mixed and then accurately weighed. The resulting mixture was maintained in the container at 105° C. for 2 hours to remove volatile components therefrom, and further allowed to stand in a desiccator for 15 minutes to measure a mass thereof. The mass of the sample after removing the volatile components therefrom was regarded as a mass of solids therein. The solid content of the sample was calculated by dividing the mass of the solids by the mass of the sample initially added.

(4) Measurement of Water Solubility Rate of Epoxy Compound

A glass tube (25 mmϕ in diameter×250 mm in height) was charged with 90 parts of ion-exchanged water and 10 parts of a crosslinking agent at room temperature (25° C.). The glass tube thus charged was allowed to stand for 1 hour in a thermostatic bath controlled to a water temperature of 25° C. Next, the contents of the glass tube were vigorously shaken for 1 minute, and then the glass tube was placed again in the thermostatic bath, followed by allowing the glass tube to stand in the bath for 10 minutes. Then, the mass of undissolved components in the glass tube were measured to calculate a water solubility rate (% by mass) of the crosslinking agent.

<Preparation of Water-Insoluble Polymers>

Preparation Example 1

Eighty two parts of methacrylic acid (reagent) available from FUJIFILM Wako Pure Chemical Corporation, 58 parts of styrene (reagent) available from FUJIFILM Wako Pure Chemical Corporation, 40 parts of a styrene macromer "AS-6S" (tradename; number-average molecular weight: 6000; solid content: 50%) (20 parts as an amount of solid components therein) available from Toagosei Co., Ltd., and 40 parts of polypropylene glycol monomethacrylate "BLEMMER PP-800" (tradename; average molar number of addition of propyleneoxide: 13; end group: hydroxy group) available from NOF Corporation were mixed to prepare a monomer mixture solution. Twenty parts of methyl ethyl ketone (MEK) and 0.3 part of 2-mercaptoethanol as a chain transfer agent as well as 10% of the monomer mixture solution prepared above were charged into a reaction vessel and mixed with each other, and then an inside atmosphere of the reaction vessel was fully replaced with nitrogen gas.

On the other hand, a mixed solution prepared by mixing remaining 90% of the monomer mixture solution, 0.27 part of the aforementioned chain transfer agent, 60 parts of MEK and 2.2 parts of an azo-based radical polymerization initiator "V-65" (tradename; 2,2'-azobis(2,4-dimethylvaleronitrile)) available from FUJIFILM Wako Pure Chemical Corporation was charged into a dropping funnel. In a nitrogen atmosphere, the monomer mixed solution in the reaction vessel was heated to 65° C. while stirring, and then the mixed solution in the dropping funnel was added dropwise thereinto over 3 hours. After the elapse of 2 hours from completion of the dropwise addition while maintaining the mixed solution at 65° C., a solution prepared by dissolving 0.3 part of the aforementioned polymerization initiator in 5 parts of MEK was added to the mixed solution, and the resulting reaction solution was further aged at 65° C. for 2 hours and then at 70° C. for 2 hours to thereby obtain a carboxy group-containing water-insoluble polymer solution (i) (number-average molecular weight of the polymer: 12000; acid value: 267 mgKOH/g).

Preparation Examples 2 to 5

The same procedure as in Preparation Example 1 was repeated except that the amounts of the respective monomer components used were changed to those shown in Table 1, thereby obtaining carboxy group-containing water-insoluble polymer solutions (ii) to (v). The results are shown in Table 1.

Preparation Example 6

The same procedure as in Preparation Example 1 was repeated except that 50 parts of acrylic acid (reagent) available from FUJIFILM Wako Pure Chemical Corporation and 150 parts of benzyl methacrylate (reagent) available from FUJIFILM Wako Pure Chemical Corporation were used as the monomer components, thereby obtaining a carboxy group-containing water-insoluble polymer solution (vi) (number-average molecular weight of the polymer: 13000; acid value: 195 mgKOH/g). The results are shown in Table 1.

Preparation Example 7

The same procedure as in Preparation Example 1 was repeated except that 50 parts of methacrylic acid, 100 parts of benzyl methacrylate and 50 parts of methoxy polyethylene glycol methacrylate "NK ESTER M-40G" (tradename; average molar number of addition of ethyleneoxide: 4; end group: methyl group) available from Shin-Nakamura Chemical Co., Ltd., were used as the monomer components, thereby obtaining a carboxy group-containing water-insoluble polymer solution (vii) (number-average molecular weight of the polymer: 15000; acid value: 163 mgKOH/g). The results are shown in Table 1.

Preparation Example 8

The same procedure as in Preparation Example 1 was repeated except that 88 parts of acrylic acid, 92 parts of benzyl methacrylate and 20 parts of "NK ESTER M-40G" were used as the monomer components, thereby obtaining a carboxy group-containing water-insoluble polymer solution (viii) (number-average molecular weight of the polymer: 13000; acid value: 343 mgKOH/g). The results are shown in Table 1.

TABLE 1

| | Preparation Examples | | | | | | | |
|---|---|---|---|---|---|---|---|---|
| | 1 | 2 | 3 | 4 | 5 | 6 | 7 | 8 |
| Kind of polymer solution | (i) | (ii) | (iii) | (iv) | (v) | (vi) | (vii) | (viii) |
| Monomers | | | | | | | | |
| (a-1) Methacrylic acid (part(s)) | 82 | 68 | 54 | 44 | 29 | | 50 | |
| (a-2) Acrylic acid (part(s)) | | | | | | 50 | | 88 |
| (b-1) Styrene (part(s)) | 58 | 72 | 86 | 96 | 111 | | | |
| (b-2) Benzyl methacrylate (part(s)) | | | | | | 150 | 100 | 92 |
| (c) Styrene macromer (part(s)) | 20 | 20 | 20 | 20 | 20 | | | |
| (d-1) "BLEMMER PP-800" (part(s)) | 40 | 40 | 40 | 40 | 40 | | | |
| (d-2) "NK ESTER M-40G" (part(s)) | | | | | | | 50 | 20 |

TABLE 1-continued

| | Preparation Examples | | | | | | | |
|---|---|---|---|---|---|---|---|---|
| | 1 | 2 | 3 | 4 | 5 | 6 | 7 | 8 |
| Kind of polymer solution | (i) | (ii) | (iii) | (iv) | (v) | (vi) | (vii) | (viii) |
| Compositional ratio | | | | | | | | |
| Content of component (a) (%) | 41.0 | 34.0 | 27.0 | 22.0 | 14.5 | 25.0 | 25.0 | 44.0 |
| Content of component (b) (%) | 29.0 | 36.0 | 43.0 | 48.0 | 55.5 | 75.0 | 50.0 | 46.0 |
| Mass ratio of [(a)/(b)] | 1.41 | 0.94 | 0.63 | 0.46 | 0.26 | 0.33 | 0.50 | 0.96 |
| Mass ratio of (a)/[(b) + (c)] | 1.05 | 0.74 | 0.51 | 0.38 | 0.22 | — | — | — |
| Results | | | | | | | | |
| Number-average molecular weight | 12000 | 12000 | 12000 | 12000 | 12000 | 13000 | 15000 | 13000 |
| Acid value (mgKOH/g) | 267 | 222 | 178 | 142 | 94 | 195 | 163 | 343 |

<Production of Aqueous Pigment Dispersion Liquids>

Production Example 1

(1) Step for Preparation of Water-Based Pigment Dispersion Liquid

Twenty five parts of the polymer produced by drying the polymer solution obtained in Preparation Example 1 under reduced pressure were mixed in 78.6 parts of MEK. Then, 11.2 parts of a 5N sodium hydroxide aqueous solution (sodium hydroxide solid content: 16.9%; for volumetric titration) available from FUJIFILM Wako Pure Chemical Corporation were further added into the resulting mixed solution to neutralize the polymer such that the ratio of the number of moles of the sodium hydroxide to the number of moles of carboxy groups of the polymer was 40% (neutralization degree: 40 mol %), followed by further adding 400 parts of ion-exchanged water thereto. Then, 100 parts of carbon black "MONARCH 800" (tradename) as a black pigment available from Cabot Corporation were added to the resulting mixture. The thus obtained dispersion was stirred at 20° C. for 60 minutes using a disper "ULTRA DISPER" (tradename) available from Asada Iron Works Co., Ltd., while operating a disper blade thereof at a rotating speed of 7000 rpm.

The thus obtained mixture was subjected to dispersion treatment under a pressure of 200 MPa using a "Microfluidizer" (tradename) available from Microfluidics Corporation by passing the mixture through the device 10 times. The thus obtained dispersion liquid was mixed with 250 parts of ion-exchanged water and stirred together, and then allowed to stand at 60° C. under reduced pressure to completely remove MEK therefrom, followed by further removing a part of water therefrom. The resulting dispersion was subjected to filtration treatment using a 25 mL-capacity needleless syringe available from Terumo Corporation fitted with a 5 μm-mesh filter (acetyl cellulose membrane; outer diameter: 2.5 cm) available from FUJIFILM Wako Pure Chemical Corporation to remove coarse particles therefrom, thereby obtaining a water-based pigment dispersion liquid having a solid content of 20%.

(2) Crosslinking Step

One hundred parts of the water-based pigment dispersion liquid obtained in the step (1) were mixed with 0.27 part of a crosslinking agent "DENACOL EX-321LT" (tradename; trimethylolpropane polyglycidyl ether; water-insoluble polyfunctional epoxy compound; water solubility rate: 27%; epoxy equivalent: 139) available from Nagase ChemteX Corporation (in an amount capable of subjecting 10 mol % of the carboxylic acid contained in polymer prepared in Preparation Example 1 to crosslinking reaction). Then, ion-exchanged water (as the balance) was added to the resulting mixture such that the solid content thereof was 20.0%, and the resulting dispersion liquid was subjected to crosslinking treatment at 70° C. for 3 hours, thereby obtaining a dispersion liquid of pigment-containing crosslinked polymer particles. The acid value of the resulting crosslinked polymer was 240 mgKOH/g.

The obtained dispersion liquid was subjected to filtration treatment using a 1.2 μm-mesh filter "MAP-010XS" available from ROKI TECHNO CO., LTD., thereby obtaining an aqueous pigment dispersion liquid 1 (solid content: 20.0%).

Production Examples 2 to 10, and 13 and 14

The same procedure as in Production Example 1 was repeated except that 25 parts of the polymer obtained by drying each of the polymer solutions (ii) to (viii) obtained in Preparation Examples 2 to 8 under reduced pressure, respectively, in place of the polymer solution (i) obtained in Preparation Example 1 were used, and the amounts of the 5N sodium hydroxide aqueous solution and the crosslinking agent "DENACOL EX-321LT" used were respectively changed to those shown in Table 2, thereby obtaining aqueous pigment dispersion liquids 2 to 10, and 13 and 14.

Production Example 11

The same procedure as in Production Example 1 was repeated except that in Production Example 3, the carbon black was replaced with a quinacridone pigment "FASTGEN SUPER MAGENTA RGT" (tradename; Pigment Red 122) available from DIC Corporation, thereby obtaining an aqueous pigment dispersion liquid 11.

Production Example 12

The same procedure as in Production Example 1 was repeated except that no crosslinking step was carried out, and the water-based pigment dispersion liquid obtained in the step (1) was subjected to filtration treatment using a 1.2 μm-mesh filter "MAP-010XS" available from ROKI TECHNO CO., LTD., thereby obtaining an aqueous pigment dispersion liquid 12 (solid content: 20.0%).

TABLE 2

| | | Kind of aqueous pigment dispersion liquid | Kind of pigment | Kind of polymer | 5N NaOH (part(s)) | Neutralization degree (mol %) |
|---|---|---|---|---|---|---|
| Production Examples | 1 | Aqueous dispersion liquid 1 | MONARCH 800 | (i) | 11.2 | 40 |
| | 2 | Aqueous dispersion liquid 2 | MONARCH 800 | (ii) | 9.3 | 40 |
| | 3 | Aqueous dispersion liquid 3 | MONARCH 800 | (iii) | 7.4 | 40 |
| | 4 | Aqueous dispersion liquid 4 | MONARCH 800 | (iv) | 6.0 | 40 |
| | 5 | Aqueous dispersion liquid 5 | MONARCH 800 | (v) | 4.0 | 40 |
| | 6 | Aqueous dispersion liquid 6 | MONARCH 800 | (v) | 4.0 | 40 |
| | 7 | Aqueous dispersion liquid 7 | MONARCH 800 | (vi) | 8.2 | 40 |
| | 8 | Aqueous dispersion liquid 8 | MONARCH 800 | (vii) | 6.9 | 40 |
| | 9 | Aqueous dispersion liquid 9 | MONARCH 800 | (viii) | 14.4 | 40 |
| | 10 | Aqueous dispersion liquid 10 | MONARCH 800 | (viii) | 14.4 | 40 |
| | 11 | Aqueous dispersion liquid 11 | RGT*1 | (iii) | 11.2 | 40 |
| | 12 | Aqueous dispersion liquid 12 | MONARCH 800 | (i) | 11.2 | 40 |
| | 13 | Aqueous dispersion liquid 13 | MONARCH 800 | (v) | 4.0 | 40 |
| | 14 | Aqueous dispersion liquid 14 | MONARCH 800 | (viii) | 14.4 | 40 |

| | | | Acid value of polymer (mgKOH/g) | | |
|---|---|---|---|---|---|
| | | Crosslinking agent (part(s)) | Before being crosslinked | After being crosslinked | Crosslinking degree (mol %) |
| Production Examples | 1 | 0.27 | 267 | 240 | 10 |
| | 2 | 0.22 | 222 | 200 | 10 |
| | 3 | 0.18 | 178 | 160 | 10 |
| | 4 | 0.14 | 142 | 128 | 10 |
| | 5 | 0.10 | 94 | 85 | 10 |
| | 6 | 0.25 | 94 | 70 | 26 |
| | 7 | 0.44 | 195 | 150 | 23 |
| | 8 | 0.63 | 163 | 100 | 39 |
| | 9 | 0.35 | 343 | 280 | 18 |
| | 10 | 0.24 | 343 | 300 | 13 |
| | 11 | 0.27 | 178 | 160 | 10 |
| | 12 | 0 | 267 | 267 | 0 |
| | 13 | 0.53 | 94 | 40 | 57 |
| | 14 | 0.13 | 343 | 320 | 7 |

Note
*1Pigment Red 122: "FASTGEN SUPER MAGENTA RGT" (tradename) available from DIC Corporation <Production of Pigment Water Dispersions>

Examples 1 to 17 and Comparative Examples 1 to 6

One hundred parts of each of the aqueous pigment dispersion liquids 1 to 14 obtained in Production Examples 1 to 14, respectively, were added and mixed with predetermined amounts of the formaldehyde-releasing compound and the like shown in Table 3, thereby obtaining pigment water dispersions 1 to 17 and 20 to 25. Incidentally, the pigment water dispersion 22 (Comparative Example 3) was obtained without adding any formaldehyde-releasing compound thereto.

The details of the antiseptic agents shown in Table 3 are as follows.

dowicil 150: Cis-1-(3-chloroallyl)-3,5,7-triaza-1-azonia-adamantane chloride (active ingredient content: 96%) available from Dow Chemical Company.

DMDMH: 1,3-Bis(hydroxymethyl)-5,5-dimethyl hydantoin (active ingredient content: 100%) available from Fluorochem Ltd.

Grotan BK: 1,3,5-triazine-1,3,5-(2H, 4H, 6H)-tris(ethanol) (active ingredient content: 100%) available from Fluorochem Ltd.

Ploxel LVS: 1,2-Benzisothiazolin-3-one (BIT) (active ingredient content: 20%) available from Arch Chemicals Japan, Inc.

Kathon CG: 2-Methyl-isothiazolin-3-one (active ingredient content: 1.5%) available from Dow Chemical Company.

<Evaluation of Pigment Water Dispersions 1 to 17 and 20 to 25>

The resulting pigment water dispersions 1 to 17 and 20 to 25 were evaluated with respect to storage stability and antiseptic and antifungal properties thereof by the following methods. The results are shown in Table 3.

<Storage Stability>

The respective dispersion liquids to which any of the antiseptic agents described above was added were stored in a closed container at 70° C. for 2 weeks or for 1 month. Then, using an E-type viscometer, the viscosities of the respective dispersions before and after being stored for 2 weeks or for 1 month were measured. The rate of change in viscosity of the respective dispersions was calculated according to the following formula (round down to the nearest decimal) to evaluate storage stability of the respective dispersions according to the following evaluation ratings.

(Evaluation Ratings)

$$\text{Rate (\%) of Change in Viscosity} = [100-[(\text{viscosity after being stored})/(\text{viscosity before being stored})] \times 100]$$

4: Absolute value of the rate of change in viscosity of the dispersion was less than 5%.

3: Absolute value of the rate of change in viscosity of the dispersion was not less than 5% and less than 10%.

2: Absolute value of the rate of change in viscosity of the dispersion was not less than 10% and less than 15%.

1: Absolute value of the rate of change in viscosity of the dispersion was not less than 15% and less than 20%, or the ink had no flowability so that the measurement of the viscosity thereof was no longer possible.

When the evaluation result was Rank 4 or 3 of the aforementioned evaluation ratings, the resulting dispersion had sufficient storage stability. Meanwhile, if the evaluation result concerning storage stability of the dispersion stored at 70° C. for 2 weeks was Rank 4 or 3 of the aforementioned evaluation ratings, the dispersion was practically usable without any significant problems. The evaluation result concerning storage stability of the dispersion is preferably Rank 4 of the aforementioned evaluation ratings, and it is more preferred that the dispersion was excellent in storage stability even after being stored for 1 month.

<Antiseptic and Antifungal Properties>

Ten milliliters (10 mL) of a test sample to be measured were inoculated with a fungus liquid (*Pseudomonas* bacteria) such that an amount of the fungus inoculated was $1 \times 10^4$ CFU/mL, and the resulting solution was allowed to stand at room temperature, so that the test sample and the fungus were brought into contact with each other for a predetermined time.

The number of fungi present in the solution was measured with time, and the antiseptic and antifungal properties of the test sample were evaluated by the change in number of fungi present in the solution.

The number of fungi present in the solution was measured as follows. That is, 0.1 mL of the solution sampled from the test sample was applied onto an SCD (soybean-casein digest) agar medium "DAIGO" available from Wako Pure Chemical Industries, Ltd., and cultivated at 30° C. for 3 days to obtain colonies of the fungi, and the number of fungi still remaining alive was determined from the number of colonies thus obtained. The difference between a logarithmic value of an incipient number of the fungi and a logarithmic value of the number of the remaining viable fungi was calculated as the number of Log of fungal decay. The antiseptic and antifungal properties of the test sample was evaluated according to the following evaluation ratings.

(Evaluation Ratings)

4: After the elapse of 1 day from the inoculation, not less than 4 Log was reduced.

3: After the elapse of 3 days from the inoculation, not less than 4 Log was reduced.

2: After the elapse of 7 days from the inoculation, not less than 4 Log was reduced.

1: After the elapse of 7 days from the inoculation, less than 4 Log was reduced, or no reduction in Log number occurred.

When the evaluation rating was Rank 4 or 3, the antiseptic and antifungal properties of the respective test samples were practically acceptable.

TABLE 3-1

| | | Examples | | | | | |
|---|---|---|---|---|---|---|---|
| | | 1 | 2 | 3 | 4 | 5 | 6 |
| No. of pigment water dispersion | | 1 | 2 | 3 | 4 | 5 | 6 |
| Composition | Aqueous pigment dispersion liquids | | | | | | |
| of pigment water dispersion (part(s)) | Aqueous dispersion liquid 1 | 100 | 100 | 100 | 100 | 100 | 100 |
| | Aqueous dispersion liquid 2 | | | | | | |
| | Aqueous dispersion liquid 3 | | | | | | |
| | Aqueous dispersion liquid 4 | | | | | | |
| | Aqueous dispersion liquid 5 | | | | | | |
| | Aqueous dispersion liquid 6 | | | | | | |
| | Aqueous dispersion liquid 7 | | | | | | |
| | Aqueous dispersion liquid 8 | | | | | | |
| | Aqueous dispersion liquid 9 | | | | | | |
| | Aqueous dispersion liquid 10 | | | | | | |
| | Aqueous dispersion liquid 11 | | | | | | |
| | Aqueous dispersion liquid 12 | | | | | | |
| | Aqueous dispersion liquid 13 | | | | | | |
| | Aqueous dispersion liquid 14 | | | | | | |
| | Formaldehyde-releasing compound, etc. | | | | | | |
| | dowicil 150 | 0.02 | | | 0.005 | 0.01 | 0.05 |
| | DMDMH | | 0.02 | | | | |
| | Grotan BK | | | 0.02 | | | |
| | Ploxel LVS | | | | | | |
| | Kathon CG | | | | | | |

TABLE 3-1-continued

| | | | | | | | |
|---|---|---|---|---|---|---|---|
| Evaluation | Storage stability (70° C.; 2 weeks) | 4 | 4 | 4 | 3 | 4 | 4 |
| | Storage stability (70° C.; 1 month) | 4 | 4 | 4 | 3 | 3 | 4 |
| | Antiseptic and antifungal properties | 4 | 4 | 4 | 2 | 3 | 4 |

| | | Examples | | | | | |
|---|---|---|---|---|---|---|---|
| | | 7 | 8 | 9 | 10 | 11 | 12 |
| No. of pigment water dispersion | | 7 | 8 | 9 | 10 | 11 | 12 |
| Composition | Aqueous pigment dispersion liquids | | | | | | |
| of pigment water dispersion (part(s)) | Aqueous dispersion liquid 1 | 100 | | | | | |
| | Aqueous dispersion liquid 2 | | 100 | | | | |
| | Aqueous dispersion liquid 3 | | | 100 | | | |
| | Aqueous dispersion liquid 4 | | | | 100 | | |
| | Aqueous dispersion liquid 5 | | | | | 100 | |
| | Aqueous dispersion liquid 6 | | | | | | 100 |
| | Aqueous dispersion liquid 7 | | | | | | |
| | Aqueous dispersion liquid 8 | | | | | | |
| | Aqueous dispersion liquid 9 | | | | | | |
| | Aqueous dispersion liquid 10 | | | | | | |
| | Aqueous dispersion liquid 11 | | | | | | |
| | Aqueous dispersion liquid 12 | | | | | | |
| | Aqueous dispersion liquid 13 | | | | | | |
| | Aqueous dispersion liquid 14 | | | | | | |
| | Formaldehyde-releasing compound, etc. | | | | | | |
| | dowicil 150 | 0.10 | 0.02 | 0.02 | 0.02 | 0.02 | 0.02 |
| | DMDMH | | | | | | |
| | Grotan BK | | | | | | |
| | Ploxel LVS | | | | | | |
| | Kathon CG | | | | | | |
| Evaluation | Storage stability (70° C.; 2 weeks) | 4 | 4 | 4 | 4 | 4 | 3 |
| | Storage stability (70° C.; 1 month) | 3 | 4 | 3 | 2 | 2 | 2 |
| | Antiseptic and antifungal properties | 4 | 4 | 4 | 4 | 4 | 4 |

| | | Examples | | | | | Comparative Examples |
|---|---|---|---|---|---|---|---|
| | | 13 | 14 | 15 | 16 | 17 | 1 |
| No. of pigment water dispersion | | 13 | 14 | 15 | 16 | 17 | 20 |
| Composition | Aqueous pigment dispersion liquids | | | | | | |
| of pigment water dispersion (part(s)) | Aqueous dispersion liquid 1 | | | | | | 100 |
| | Aqueous dispersion liquid 2 | | | | | | |
| | Aqueous dispersion liquid 3 | | | | | | |
| | Aqueous dispersion liquid 4 | | | | | | |
| | Aqueous dispersion liquid 5 | | | | | | |
| | Aqueous dispersion liquid 6 | | | | | | |
| | Aqueous dispersion liquid 7 | 100 | | | | | |
| | Aqueous dispersion liquid 8 | | 100 | | | | |
| | Aqueous dispersion liquid 9 | | | 100 | | | |
| | Aqueous dispersion liquid 10 | | | | 100 | | |
| | Aqueous dispersion liquid 11 | | | | | 100 | |
| | Aqueous dispersion liquid 12 | | | | | | |
| | Aqueous dispersion liquid 13 | | | | | | |
| | Aqueous dispersion liquid 14 | | | | | | |
| | Formaldehyde-releasing compound, etc. | | | | | | |
| | dowicil 150 | 0.02 | 0.02 | 0.02 | 0.02 | 0.02 | |
| | DMDMH | | | | | | |
| | Grotan BK | | | | | | |
| | Ploxel LVS | | | | | | 0.02 |
| | Kathon CG | | | | | | |
| Evaluation | Storage stability (70° C.; 2 weeks) | 4 | 4 | 4 | 3 | 4 | 2 |
| | Storage stability (70° C.; 1 month) | 3 | 3 | 3 | 3 | 3 | 2 |
| | Antiseptic and antifungal properties | 4 | 4 | 4 | 4 | 4 | 4 |

| | | Comparative Examples | | | | |
|---|---|---|---|---|---|---|
| | | 2 | 3 | 4 | 5 | 6 |
| No. of pigment water dispersion | | 21 | 22 | 23 | 24 | 25 |
| Composition | Aqueous pigment dispersion liquids | | | | | |
| of pigment water dispersion (part(s)) | Aqueous dispersion liquid 1 | 100 | | | | |
| | Aqueous dispersion liquid 2 | | | | | |
| | Aqueous dispersion liquid 3 | | | | | |
| | Aqueous dispersion liquid 4 | | | | | |

TABLE 3-1-continued

| | | Col1 | Col2 | Col3 | Col4 | Col5 |
|---|---|---|---|---|---|---|
| | Aqueous dispersion liquid 5 | 100 | | | | |
| | Aqueous dispersion liquid 6 | | | | | |
| | Aqueous dispersion liquid 7 | | | | | |
| | Aqueous dispersion liquid 8 | | | | | |
| | Aqueous dispersion liquid 9 | | | | | |
| | Aqueous dispersion liquid 10 | | | | | |
| | Aqueous dispersion liquid 11 | | | | | |
| | Aqueous dispersion liquid 12 | | | 100 | | |
| | Aqueous dispersion liquid 13 | | | | 100 | |
| | Aqueous dispersion liquid 14 | | | | | 100 |
| | Formaldehyde-releasing compound, etc. | | | | | |
| | dowicil 150 | | | 0.02 | 0.02 | 0.02 |
| | DMDMH | | | | | |
| | Grotan BK | | | | | |
| | Ploxel LVS | | | | | |
| | Kathon CG | 0.02 | | | | |
| Evaluation | Storage stability (70° C.; 2 weeks) | 2 | 1 | 2 | 1 | 2 |
| | Storage stability (70° C.; 1 month) | 2 | 1 | 2 | 1 | 2 |
| | Antiseptic and antifungal properties | 4 | 1 | 4 | 4 | 2 |

As is apparent from the evaluation results shown in Table 3, it was confirmed that the pigment water dispersions 1 to 17 obtained in the respective Examples according to the present invention were excellent in storage stability even after being stored under high-temperature conditions for a long period of time as compared to the pigment water dispersions 20 to 25 obtained in the respective Comparative Examples. In addition, from the evaluation results of Example 4, it was confirmed that the effect of improving the storage stability could be still ensured even when the antiseptic agent was used in such a small amount as being disadvantageous for improvement in the antiseptic and antifungal properties.

INDUSTRIAL APPLICABILITY

The pigment water dispersion of the present invention is in the form of a pigment water dispersion that is prepared by dispersing a pigment with a crosslinked polymer having an acid value of not less than 70 mgKOH/g, and more particularly in the form of a pigment water dispersion that is prepared by dispersing a pigment with a crosslinked polymer having a still higher acid value of not less than 150 mgKOH/g. The pigment water dispersion can exhibit excellent storage stability even when stored under high-temperature conditions for a long period of time, and is therefore useful, in particular, as a pigment water dispersion for ink-jet printing.

The invention claimed is:

1. A pigment water dispersion comprising a pigment, a crosslinked polymer and water, in which the crosslinked polymer is prepared by crosslinking a carboxy group-containing polymer with a polyfunctional epoxy compound, and has an acid value of not less than 70 mgKOH/g and not more than 300 mgKOH/g; and the pigment water dispersion further comprises a formaldehyde-releasing compound,
wherein the carboxy group-containing polymer is an acrylic polymer, and the formaldehyde-releasing compound is at least one compound selected from the group consisting of 1,3,5-triazine-1,3,5-(2H, 4H, 6H)-tris (ethanol), 1,3 -bis(hydroxymethyl)-5,5-dimethyl hydantoin and cis-1-(3-chloroallyl)-3,5,7-triaza-1-azonia adamantane chloride,
wherein a content of water in the pigment water dispersion is not less than 50% by mass and not more than 90% by mass.

2. The pigment water dispersion according to claim 1, wherein a content of the formaldehyde-releasing compound in the pigment water dispersion is not less than 100 ppm and not more than 1500 ppm.

3. The pigment water dispersion according to claim 1, wherein a mass ratio of the formaldehyde-releasing compound to the crosslinked polymer [formaldehyde-releasing compound/crosslinked polymer] in the pigment water dispersion is not less than 0.001 and not more than 0.05.

4. The pigment water dispersion according to claim 1, wherein an epoxy equivalent of the polyfunctional epoxy compound is not less than 100 and not more than 300.

5. The pigment water dispersion according to claim 1, wherein a crosslinking degree of the carboxy group-containing polymer is not less than 5 mol % and not more than 40 mol %.

6. The pigment water dispersion according to claim 1, wherein the pigment and the crosslinked polymer are present in the form of pigment-containing crosslinked polymer particles.

7. The pigment water dispersion according to claim 1, wherein the pigment-containing crosslinked polymer particles are produced by a process comprising the following steps 1 to 3:
Step 1: subjecting a mixture comprising a carboxy group-containing water-insoluble polymer, an organic solvent, the pigment and water to dispersion treatment to obtain a dispersion liquid of pigment-containing water-insoluble polymer particles;
Step 2: removing the organic solvent from the dispersion liquid obtained in the step 1 to obtain a water dispersion liquid of the pigment-containing water-insoluble polymer particles; and
Step 3: subjecting the water-based pigment dispersion liquid obtained in the step 2 to crosslinking treatment with a crosslinking agent to obtain an aqueous pigment dispersion liquid comprising pigment-containing crosslinked water-insoluble polymer particles.

8. The pigment water dispersion according to claim 1, wherein a content of the crosslinked polymer in the pigment water dispersion is not less than 1% by mass and not more than 8% by mass.

9. The pigment water dispersion according to claim 1, wherein the carboxy group-containing polymer is a water-insoluble polymer.

10. The pigment water dispersion according to claim 9, wherein an acid value of the water-insoluble polymer is not less than 90 mgKOH/g and not more than 350 mgKOH/g.

11. The pigment water dispersion according to claim 9, wherein the water-insoluble polymer comprises a constitutional unit derived from (a) a carboxy group-containing vinyl monomer and a constitutional unit derived from (b) a hydrophobic vinyl monomer.

12. The pigment water dispersion according to claim 11, wherein the water-insoluble polymer further comprises at least one constitutional unit selected from the group consisting of a constitutional unit derived from (c) a macromonomer and a constitutional unit derived from (d) a nonionic monomer.

13. The pigment water dispersion according to claim 1, wherein a molecular weight of the polyfunctional epoxy compound is not less than 120 and not more than 2000.

14. The pigment water dispersion according to claim 1, wherein the polyfunctional epoxy compound is at least one compound selected from the group consisting of polypropylene glycol diglycidyl ether, trimethylolpropane polyglycidyl ether and pentaerythritol polyglycidyl ether.

15. The pigment water dispersion according to claim 1, wherein an acid value of the crosslinked polymer is not less than 85 mgKOH/g and not more than 280 mgKOH/g.

16. The pigment water dispersion according to claim 1, wherein a mass ratio of the pigment to the crosslinked polymer (pigment/crosslinked polymer) is not less than 0.8 and not more than 5.

17. A water-based ink for ink-jet printing comprising the pigment water dispersion according to claim 1.

* * * * *